US009621687B2

(12) United States Patent
Koenig et al.

(10) Patent No.: US 9,621,687 B2
(45) Date of Patent: *Apr. 11, 2017

(54) WIRELESS SHARED RESOURCE COMPUTING

(71) Applicant: Microsoft Technology Licensing, LLC, Redmond, WA (US)

(72) Inventors: Michael F. Koenig, Bellevue, WA (US); Neil S. Fishman, Bothell, WA (US); Ira L. Snyder, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,268

(22) Filed: Aug. 31, 2015

(65) Prior Publication Data

US 2015/0373168 A1    Dec. 24, 2015

Related U.S. Application Data

(63) Continuation of application No. 12/751,587, filed on Mar. 31, 2010, now Pat. No. 9,125,027.

(51) Int. Cl.
*G06F 15/16* (2006.01)
*H04L 29/06* (2006.01)
(Continued)

(52) U.S. Cl.
CPC .............. *H04L 69/24* (2013.01); *H04W 4/08* (2013.01); *H04W 76/02* (2013.01); *H04W 88/04* (2013.01)

(58) Field of Classification Search
CPC ....................................................... G06F 15/16
(Continued)

(56) References Cited

U.S. PATENT DOCUMENTS 6,748,195 B1    6/2004 Phillips
6,772,331 B1    8/2004 Hind et al.
(Continued)

OTHER PUBLICATIONS

Nicolai et al, "Wireless Rope: Experiment in Social Proximity Sensing with Bluetooth", retrieved on Dec. 14, 2009 at <<http://www.cl.cam.ac.uk/~ey204/pubs/2006_PerCom_Demo.pdf>>, IEEE International Conference on Pervasive Computing and Communications, Mar. 2006, pp. 1-2.
(Continued)

*Primary Examiner* — David Lazaro
*Assistant Examiner* — Marie Georges Henry
(74) *Attorney, Agent, or Firm* — Lee & Hayes, PLLC

(57) ABSTRACT

The formation of a wireless device group for use in a computing environment involves establishing a wireless communication connection between a host wireless interface device and each of one or more dependent wireless interface devices, in which each dependent wireless interface device is configured to not directly communicate with a computing device. Another wireless communication connection is established between the host wireless interface device and the computing device when the host wireless interface device is within a host connection distance of the computing device. A further wireless communication connection can be established between the host wireless interface device and a second, different computing device.

18 Claims, 12 Drawing Sheets

(51) Int. Cl.
*H04W 4/08* (2009.01)
*H04W 76/02* (2009.01)
*H04W 88/04* (2009.01)

(58) Field of Classification Search
USPC .................................. 709/227, 239; 370/359
See application file for complete search history.

(56) References Cited

U.S. PATENT DOCUMENTS

| | | | |
|---|---|---|---|
| 7,594,059 | B2 | 9/2009 | Townsend |
| 7,646,712 | B2 | 1/2010 | Cohen et al. |
| 7,706,777 | B2 | 4/2010 | Karaoguz et al. |
| 2006/0104232 | A1 | 5/2006 | Gidwani |
| 2007/0287501 | A1* | 12/2007 | Hoshina ............... H04W 16/02 455/562.1 |
| 2008/0095086 | A1 | 4/2008 | Linkola et al. |
| 2008/0305741 | A1 | 12/2008 | Fornell et al. |
| 2009/0156244 | A1 | 6/2009 | Jabaud et al. |
| 2009/0183225 | A1 | 7/2009 | Malakapalli et al. |
| 2009/0193155 | A1 | 7/2009 | Skillman et al. |
| 2010/0093401 | A1* | 4/2010 | Moran .................. G06F 1/1626 455/566 |
| 2011/0019557 | A1 | 1/2011 | Hassan et al. |
| 2011/0317665 | A1 | 12/2011 | Jung et al. |

OTHER PUBLICATIONS

Office action for U.S. Appl. No. 12/751,587, mailed on Jan. 9, 2013, Koenig et al., "Wireless Shared Resource Computing", 14 pages.
Final Office Action for U.S. Appl. No. 12/751,587, mailed on Jul. 16, 2013, Koenig et al., "Wireless Shared Resource Computing", 15 pages.
Office action for U.S. Appl. No. 12/751,587, mailed on Aug. 29, 2014, Koenig et al., "Wireless Shared Resource Computing", 16 pages.
Saxena et al, "Secure Device Pairing based on a Visual Channel", retrieved on Dec. 14, 2009 at <<http://eprint.iacr.org/2006/050.pdf>>, IEEE Symposium on Security and Privacy, Jun. 2006, 17 pgs.

* cited by examiner

WIRELESS SHARED RESOURCE COMPUTING

CROSS-REFERENCE TO RELATED APPLICATION

This application is a continuation of, and claims priority to, U.S. patent application Ser. No. 12/751,587, filed Mar. 31, 2010, entitled "Wireless Shared Resource Computing," the entirety of which is herein incorporated by reference.

BACKGROUND

Computer users predominately use personal computing devices, such as desktop computers, to independently handle computing tasks or produce work products. Each of these personal computing devices is generally equipping with its own independent operating system and software applications. However, in some instances, computer users may also desire to work cooperatively on the same computing task or share in a common computing experience. For example, the computer users may desire to concurrently edit the same text document, or work on the same multimedia presentation. In such instances, each of the computer users may connect his or her personal computer to the other personal computers via networking software and hardware.

In some instances, there may be technical or logistical barriers to such current collaboration. For example, a network-based environment that enables such concurrent collaboration may be based on the use of multiple computing devices of different specification and manufacture, which may be difficult to network and expensive to maintain.

SUMMARY

Described herein are techniques for the automatic connection of multiple wireless device groups to a computing device, or to one of a plurality of computing devices. Implementations herein enable the formation of a wireless device group for use in the shared resource computing environment. The formation involves establishing a wireless communication connection between a host wireless interface device and each of one or more dependent wireless interface devices, in which each dependent wireless interface devices is configured to not directly communicate with a computing device. Another wireless communication connection is established between the host wireless interface device and the computing device when the host wireless interface device is within a host connection distance of the computing device.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
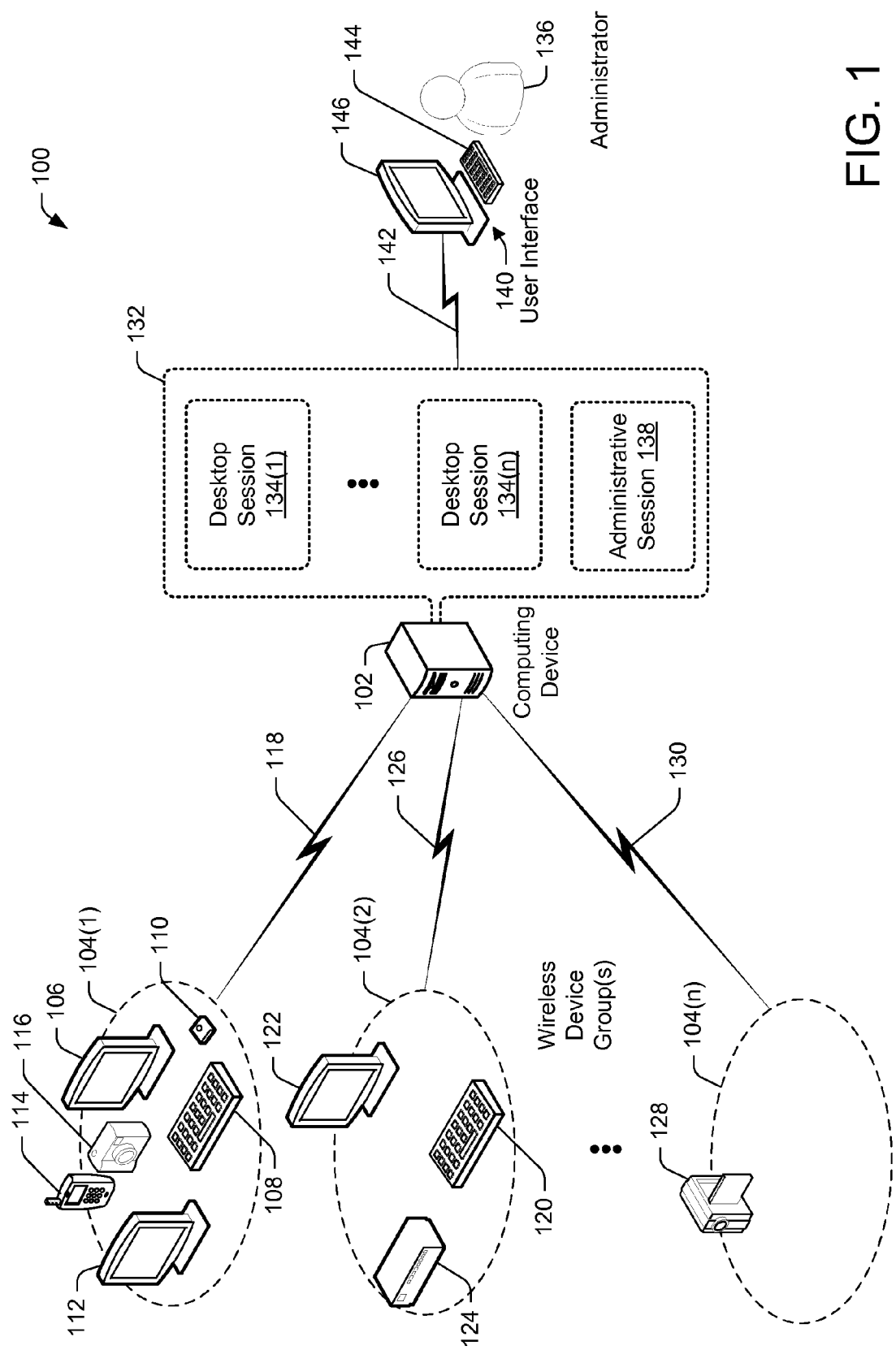
FIG. 1 is a block diagram that illustrates an example shared resource computing architecture that enables the automatic connection of one or more wireless device groups to a single computing device.

Implementations described herein provide techniques for the automatic connection of multiple wireless device groups to a single computing device that provides a shared resource computing (SRC) environment. For example, each of the wireless device groups may enable a corresponding computer user to provide input data to the computing device, as well as receive output data from the computing device. A wireless device group may be built around a host wireless interface device. The host wireless interface device may manage anywhere from zero to multiple dependent wireless interface devices. The host wireless interface device may connect its wireless device group to the computing device. In this way, the shared resource computing environment, as implemented on the single computing device, may enable multiple computer users to concurrently collaborate on the same computing task or share in the same computing experience via the wireless device groups. Accordingly, the cost and effort that are associated with maintaining multiple computing devices, as well as a computer network for the purpose of concurrent collaboration on a computing task or sharing in a common computing experience may be reduced or eliminated.

In various implementations, the multiple users may collaborate on the same computing task or share in a common computing experience via one or more desktop sessions of the shared resource environment. For example, the one or more desktop session may be running on the single computing device. Each desktop session may be an environment, which may be presented as a window, in which multiple users may interact with each other by concurrently entering user input, as well as viewing the outcome generated by the user input, and/or the reactions of other computer users to the input. For example, a desktop session may enable the multiple users to simultaneously edit a document, cooperatively solve a puzzle, or play a multi-player game.

In some implementations, the formation of a wireless device group for use in the shared resource computing environment may involve using a host wireless interface device to detect a companion wireless device within a device proximity range. As such, if the detected companion device is a dependent wireless interface device that is incapable of directly communicating with a computing device, or configured to not directly communicate with the computing device, the host wireless interface device may directly establish a wireless communication connection with dependent wireless interface device. However, when the detected companion device is another host wireless interface device, the host wireless interface device may negotiate a communication relationship with the other host wireless interface device, and may establish a wireless communication connection with the other host wireless interface device based on the negotiated communication relationship.

Through the use of the shared resource computing environment and multiple wireless device groups that connect automatically to the shared resource computing environment, the cost and effort of maintaining a network environment for the purpose of concurrent collaboration on a computing task or sharing in a common computing experience may be eliminated. Various examples of the automatic connection of multiple wireless device groups to a single computing device for the purpose of interacting with the desktop session of a shared resource computing environment in accordance with the embodiments are described below with reference to FIGS. 1-11.

Example Architecture

FIG. 1 illustrates an example shared resource computing architecture 100 that enables the administration of multiple computer users that are sharing multiple desktop sessions on a single computing device.

The example architecture 100 may be implemented on a computing device 102. The computing device 102 may be capable of simultaneously receiving a plurality of user inputs from multiple wireless device groups, as well as providing processed data to the users via the multiple wireless device groups. In various embodiments, the computing device 102 may be a desktop computer, a laptop computer, a multimedia computer, a server, or the like. The computing device 102 may also have wireless communication capabilities that enable the computing device 102 to communicatively connect with the multiple wireless device groups.

In various embodiments, each of the wireless device groups may include a host wireless interface device. As used herein, "host wireless interface device" refers to a wireless device that is capable of establishing wireless communication connections with the computing device 102 and one or more dependent user interface devices. A wireless device group may also include one or more dependent wireless interface devices. Further as used herein, "dependent wireless interface device" refers to a wireless device that is capable of establishing a wireless communication connection with a host user interface device, and using that communication connection to communicate with other dependent user interface devices. However, the "dependent wireless interface device" may be incapable of or not configured for directly establishing a wireless communication connection with the computing device 102. In other words, the host wireless interface device may act as a hub that communicatively connects the dependent wireless interface devices to each other and to the computing device 102, so that the linked devices may electronically exchange data. Accordingly, as further described below, each of the devices in the wireless device groups may have wireless communication capabilities.

For example, as shown in FIG. 1, a wireless device group 104(1) may include a monitor 106 that is a host wireless interface device. The wireless device group 104(1) may further include a keyboard 108, a mouse 110, another monitor 112, a smart phone 114, and a digital camera 116 that are dependent wireless interface devices. Accordingly, each of the dependent wireless interface devices 108-116 may wirelessly connect to the host wireless interface device, that is, the monitor 106. In turn, the monitor 106 may wirelessly connect to the computing device 102 via the wireless communication connection 118.

Likewise, a wireless device group 104(2) may include a keyboard 120 that is a host wireless interface device. The wireless device group 104(2) may further include a monitor 122 and a game console 124 that are dependent wireless interface devices. Accordingly, the dependent wireless interface devices 122-124 may wirelessly connect to the host wireless interface device, that is, the keyboard 120. In turn, the keyboard 120 may wirelessly connect to the computing device 102 via the wireless communication connection 126.

However, in some instances, a wireless device group may include only a host wireless interface device without any dependent wireless interface devices. This may be due to the fact that no dependent wireless interface devices have yet to join the wireless device group. For example, a wireless device group 104(n) may include a digital video camera 128 that is a host wireless interface device. The digital video camera 128 may be wirelessly connected to the computing device 102 via the wireless communication connection 130.

In various embodiments, a host wireless interface device, such as the monitor 106, may automatically connect to the computing device 102 when the host wireless interface device is within a predetermined host connection distance from the computing device 102. In such an embodiment, when the host wireless interface device determines that it is within the predetermined host connection distance of the computing device 102, the host wireless interface device may initiate a communication connection with the computing device 102. The communication connection may be established when the computing device 102 accepts the connection request. For example, the monitor 106 may establish a wireless communication connection with the computing device 102 when it is moved to a location that is within 25 feet of the computing device 102.

In other embodiments, the communication negotiation between the host wireless interface device and the computing device 102 may also work in reverse, that is, with the computing device 102 initiating a communication connection when the host wireless interface device is within the predetermined host connection range. In such embodiments, the communication connection may be established when the host wireless interface device accepts the connection request.

The various dependent wireless interface devices in a wireless device group may also automatically connect with the host wireless interface device when each dependent wireless interface device is placed within a predetermined device connection distance of the host wireless interface device. Returning to the example of the wireless device group 104(1), when the keyboard 108 is placed within three feet of the monitor 106, the keyboard 108 and the monitor 106 may automatically establish a communication connection with each other. In such embodiments, the communication connection may be initiated by a dependent wireless interface device and accepted by the host wireless interface device, or vice versa. Once a dependent wireless interface device has establish a communication connection with a host wireless interface device, the dependent wireless interface device may have the ability to exchange data with (1) the connected host wireless interface device; (2) the computing device 102 that is connected with the host wireless interface device; and (3) one or more other dependent wireless interface devices that are connected with the host wireless interface device. For example, when the keyboard 108 (dependent wireless interface device) is placed within three feet of the monitor 106 (host wireless interface device), the keyboard 108 and the monitor 106 may establish a wireless communication connection with each other.

The wireless communication connections described in FIG. 1 may be based on any wireless radio frequency (RF) communication technology. For example, but not as a limitation, the various wireless communication technologies may include cellular network, Wireless Fidelity (Wifi), World Interoperability for Microwave Access (WiMax), Bluetooth®, Wireless Universal Serial Bus (USB), Ultra-wideband (UWB), and/or the like. Further, a wireless device in any of the wireless groups, such as the monitor 106, may include hardware and/or software implementations of any combination of one or more radio frequency (RF) communication technologies. In this way, cross compatibility between different devices may be increased. For example, the monitor 106 may communicate with the keyboard 108 via Wireless USB, while simultaneously communicate with the mouse 110 via Bluetooth®. In at least one embodiment, when any two wireless devices are both equipped with multiple compatible wireless communication hardware/software, the two wireless devices may automatically default to the wireless communication hardware/software that provides the fastest data transfer rate.

In various embodiments, the computing device 102 may provide a shared resource computing environment 132. Thus, computer users may access one or more desktop sessions, such as the desktop sessions 134(1)-134(n), that are included in shared resource computing environment 132. Each of the desktop sessions 134(1)-134(n) may be a workspace where a single computer user may engage in a computing task, or where a plurality of computer users may collaborate on the same computing task or share in a common computing experience.

For example, as shown in FIG. 1, the desktop session 134(1) may be running a multi-user word processing application that enables computer users to concurrently edit a document via the wireless device groups 104(1) and 104(2), respectively. As used herein, "concurrently" may refer to the simultaneous or the sequential input of data to produce a result. Likewise, the desktop session 134(n) may be running a video application that enables a second computer user to upload videos via the user wireless device group 104(n).

The desktop sessions of the shared resource computing environment 132, such as the desktop sessions 134(1)-134 (n), may be administered by an administrator 136 using an administrative session 138. The administrator 136 may interact with the administrative session 138 using a user interface 140 that is connected to the computing device via a communication connection 142. In at least one embodiment, the user interface 140 may be a wireless device group that includes a keyboard 144, a monitor 146, and/or a mouse (not shown). The user interface 140 may also enable the administrator 136 to control the communication connections between the computing device 102 and the various wireless device groups 104(1)-104(n). For example, the administrator 136 may use the administration session 138 to cause the computing device 102 to refuse a communication connection request from a host wireless interface device, terminate a communication connection to a host wireless interface device, and/or the like.

It will be appreciated that the wireless device groups 104(1)-104(n) are illustrative rather than limiting, and that any number of wireless device groups may simultaneously form communication connections with the computing device 102 in other embodiments. Moreover, the wireless devices in each group are not limited to those shown in FIG. 1, and any electronic device may be equipped with the ability to join a wireless device group in the various embodiments.

Example Shared Resource Computing Device Components

Figure 2:
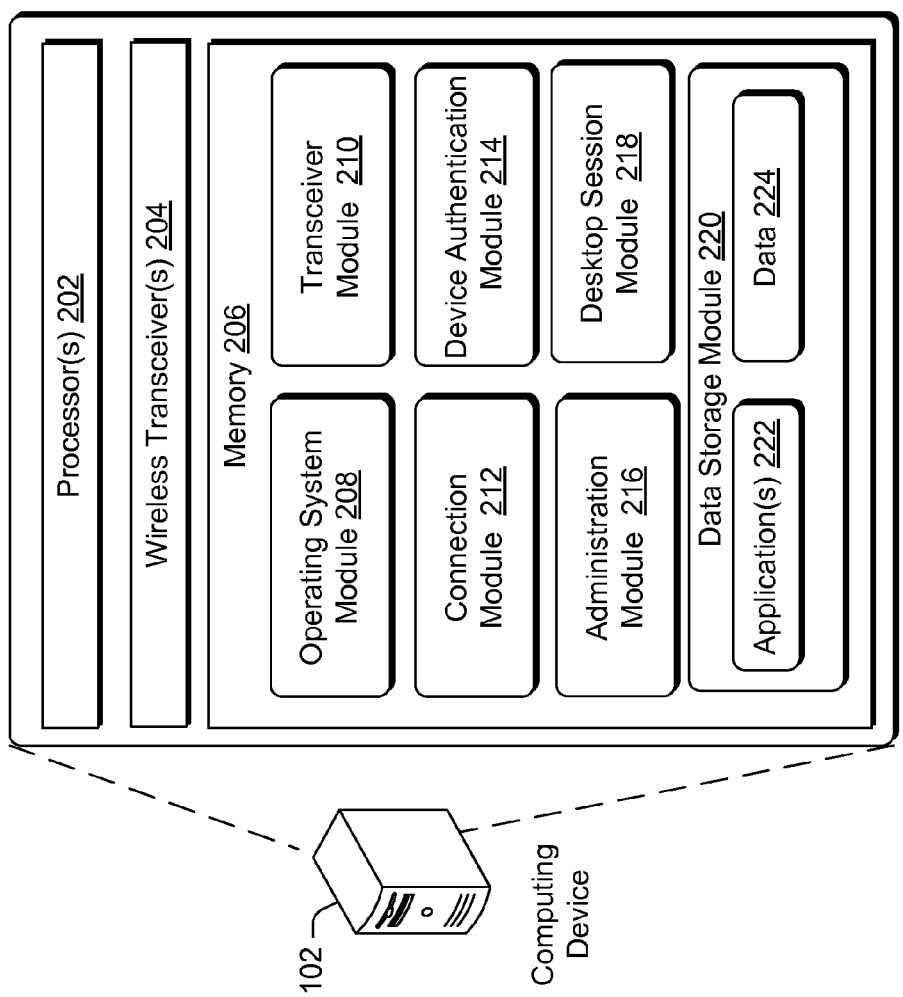
FIG. 2 is a block diagram that illustrates selected components of a shared resource computing device that connects to one or more wireless device groups.

FIG. 2 is a block diagram that illustrates selected components of a shared resource computing device 102 that connects to one or more wireless device groups. The computing device 102 may include one or more processors 202, one or more wireless transceivers 204, and a memory 206. The wireless transceivers 204 may be capable of transmitting and receiving data via a variety of RF communication technologies. These RF communication technologies may include, but are not limited to, wireless cellular network, Wireless Fidelity (Wifi), World Interoperability for Microwave Access (WiMax), Bluetooth®, Wireless Universal Serial Bus (USB), Ultra-wideband (UWB), and/or the like.

The memory 206 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 206 may store the selected components of the shared resource computing device 102. The components may be in the form of routines, programs, objects, and data structures that cause the performance of particular tasks or implement particular abstract data types. In various embodiments, the components may include an operating system module 208, a transceiver module 210, a connection module 212, a device authentication module 214, an administration module 216, a desktop session module 218, and a data storage module 220.

The operating system module 208 may include at least one operating system that enables the computing device 102 to receive data via various inputs (e.g., user controls, network interfaces, and/or memory devices), and processes data using the one or more processors 202 to generate output. The operating system may also include a display function that presents the output (e.g., displays the output on an electronic display, stores data in memory, transmits data to another electronic device, etc.). The operating system may further provide resources and services for the implementation and execution of various applications, such as one or more applications 222 stored in the data storage module 220. In various embodiments, the operating system may include a window-based graphical user interface (GUI) architecture that presents a "desktop" as the primary environment for computer users to interact with the operating system and applications. Additionally, the operating system may perform various other functions generally associated with such a system.

In some embodiments, the operating system module 208 may also include platform virtualization functionalities that enable the computing device 102 to perform hypervisor functionalities, that is, host multiple operating systems concurrently with the same underlying hardware resource.

The transceiver module 210 may enable the other modules of the computing device 102 to exchange data with other wireless devices via the wireless transceivers 204. In various embodiments, the transceiver module 210 may include software that facilitates the operations of the wireless transceivers 204 (e.g., protocol layer, network layer, link layer, transport layer, application layer, session layer, encryption layer, and/or the like). Accordingly, the transceiver module 210 may transmit output data that is generated by the various modules of the computing device 102 to the other wireless devices, as well as receive input data from the other wireless devices.

In various embodiments, rather than being a separate module, the transceiver module 210 may be an integral part of the operating system module 208. In alternative embodiments, the transceiver module 210 may be a built-in component of the one or more operating systems that are stored in the operating system module 208.

The connection module 212 may use the transceiver module 210 to detect and communicate with the host wireless interface devices. In at least one embodiment, the connection module 212 may detect the host wireless interface devices by broadcast an identifier signal, and monitor for reply signals from the host wireless interface devices for establishing communication connections. In other embodiments, the connection module 212 may monitor for identifier signals from the host wireless interface devices, and transmit reply signals to establish communication connections. The connection module 212 may establish communication connections with one or more host wireless interface devices using a variety of protocols, depending on the RF communication technologies used by those host wireless interface devices. For example, the computing device 102 may communicate with a first host wireless interface device, e.g., the monitor 106, of the wireless device group 104(1) via UWB, while simultaneously communicate with a second host wireless interface device, e.g., keyboard 120 via Bluetooth®.

In various embodiments, the connection module 212 may have the ability to determine the distance between itself and a particular host wireless interface device. In at least one of such embodiments, the connection module 212 may determine this distance based on the strength of the signal received from the particular host wireless interface device. In other embodiments in which both the computing device 102 and the particular host wireless interface device have global positioning system (GPS) hardware and/or software, the computing device 102 may rely on GPS position data to determine its distance to the particular host wireless interface device. In still other embodiments in which the computing device 102 has the ability to exchange data with other similar shared resource computing devices or in which the particular host wireless interface device uses cellular communication technology, the computing device 102 may use signal triangulation to determine the location, and therefore, the distance to the particular computing device 102. Nevertheless, it will be appreciated that the above embodiments of distance determination are illustrative rather than limiting, and that a combination of one or more of the above distance determination techniques, as well as other distance determination techniques, may be implemented by the connection module 212 in additional embodiments.

In at least one embodiment, the connection module 212 may automatically connect the computing device 102 with a host wireless interface device when the host wireless interface device is within a predetermined distance (e.g., 25 feet) of the computing device 102. Moreover, as further described below, the connection module 212 may also disconnect a host wireless interface device from the computing device 102 on an automatic basis or in response to a user input.

The device authentication module 214 may be used by the connection module 212 to authenticate a host wireless interface device based on authentication credentials. In this way, the connection module 212 may control access to the shared resource computing environment 132. The authentication module 214 may authenticate a host wireless interface device based on device characteristics and/or characteristics of the user that are submitted via the host wireless interface device. For example, the device characteristics may include, but are not limited to, a device identifier, an encrypted key that is stored on the host wireless interface device, and/or the like. The user characteristics may include, but are not limited to, a user name, a password, an electronic certificate, biometric characteristics, and/or the like. Accordingly, in various embodiments, the device authentication module 214 may cause a host wireless interface device to prompt a user to provide a user characteristic to the device authentication module 214 prior to establishing a communication connection with the host wireless interface device. For example, when the host wireless interface device is a keyboard 108 that includes a thumbprint reader, the device authentication module 214 may cause the keyboard 108 to flash an indicator light that alerts the user to input his or her thumbprint via the thumbprint reader. Following authentication by the device authentication module 214, the connection module 212 may establish a communication connection with the host wireless interface device.

The administration module 216 may enable the administrator 136 to manage the desktop sessions 134(1)-134(n), as well as manage the interaction of the computing device 102 with the host wireless interface devices. In various embodiments, the administration module 216 may generate an administrative session, such as the administrative session 138 described in FIG. 1. As previously described, the administration session 138 may enable an administrator to refuse a communication connection request from a host wireless interface device, terminate a communication connection to a host wireless interface device, and/or the like.

The desktop session module 218 may generate the shared resource computing environment 132 that includes one or more desktop sessions, such as the desktop sessions 134(1)-134(n) shown in FIG. 1. As described with respect to FIG. 1, each of the desktop sessions may be a workspace where a single computer user may engage in a computing task, or where a plurality of computer users may concurrently collaborate on the same computing task or share in a common computing experience. In various embodiments, the desktop session module 218 may present each of the desktop sessions as a "window" in a desktop of a window-based operating system. The multiple computer users may concurrently interact with the one or more applications within each of the desktop sessions.

The data storage module 220 may store data used by the shared resource computing environment 132. The data storage module 220 may store one or more applications 222 and the data 224. The applications 222 may be applications that are executed in the desktop sessions 134(1)-134(n) of the shared resource computing environment 132. The data 224 may include data that is used by the various modules of the computing device 102 to implement the shared resource computing environment 132. In various embodiments, the data 224 may include authentication data used by the authentication module 214, data on the host wireless interface devices and wireless device groups, data and states of the desktop sessions, and/or the like.

Example Host Wireless Interface Device Components

Figure 3:
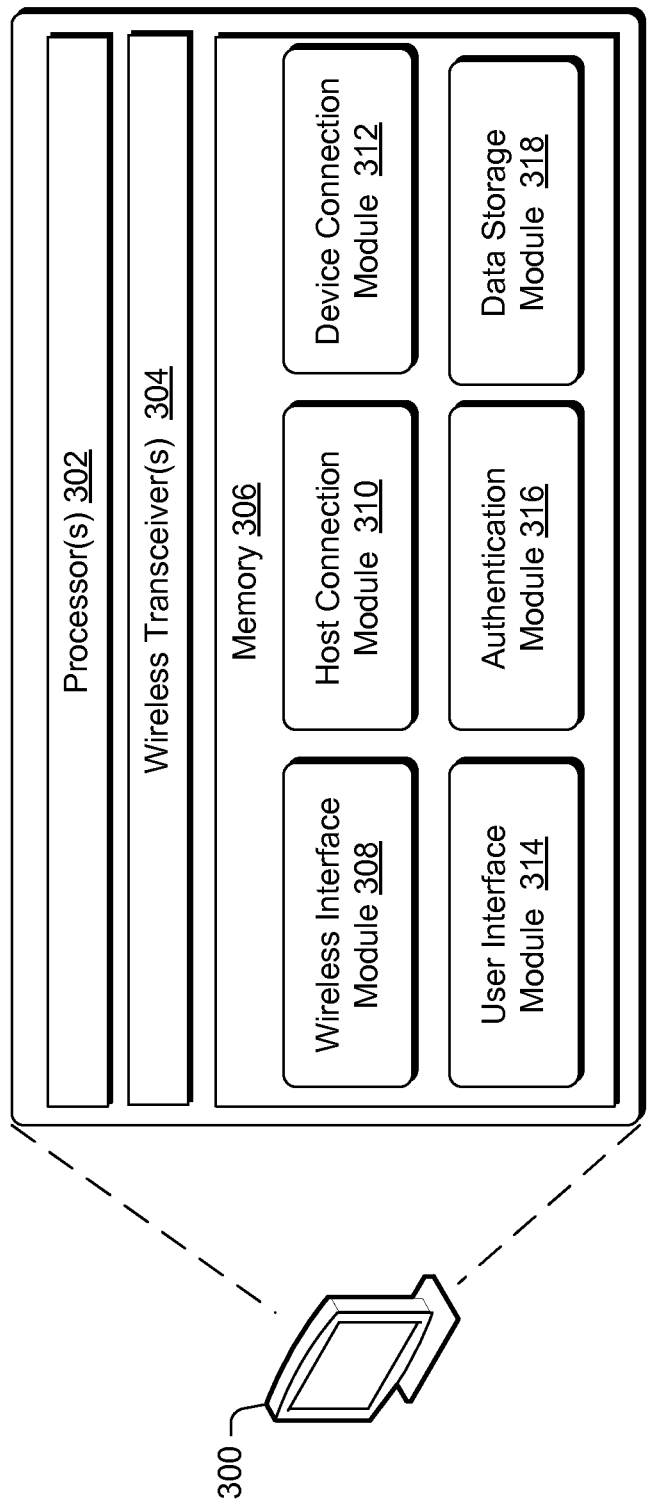
FIG. 3 is a block diagram that illustrates selected components of a wireless device that connects to the shared resource computing device and one or more dependent wireless interface devices.

FIG. 3 is a block diagram that illustrates selected components of a host wireless interface device 300 that connects to the shared resource computing device and one or more dependent wireless interface devices. The host wireless interface device 300 may include one or more processors 302, one or more wireless transceivers 304, and a memory 306. The wireless transceivers 304 may be capable of transmitting and receiving data via a variety of RF communication technology. These RF communication technology may include, but is not limited to, wireless cellular network, Wireless Fidelity (Wifi), World Interoperability for Microwave Access (WiMax), Bluetooth®, Wireless Universal Serial Bus (USB), Ultra-wideband (UWB), and/or the like.

The memory 306 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 306 may store the selected components of the wireless device 300. The components may be in the form of routines, programs, objects, and data structures that cause the performance of particular tasks or implement particular abstract data types. In various embodiments, the components may include a wireless interface module 308, a host connection module 310, a device connection module 312, a user interface module 314, an authentication module 316, and a data storage module 318.

The wireless interface module 308 may enable the other modules of the wireless device 300 to exchange data with other wireless devices via the wireless transceivers 204. In various embodiments, the wireless interface module 308 may include software that facilitates the operations of the wireless transceivers 204 (e.g., protocol layer, network layer, link layer, transport layer, application layer, session layer, encryption layer, and/or the like). Accordingly, the wireless interface module 308 may further enable output data that is generated by the various modules of the wireless device 300 to be provided to other wireless devices, as well as receive input data from the other wireless devices.

The host connection module 310 may use the wireless interface module 308 to detect and communicate with the computing device 102. In at least one embodiment, the host connection module 310 may detect the computing device 102 by broadcast an identifier signal, and monitor for reply signals from the computing device 102 for establishing communication connections. In other embodiments, the host connection module 310 may monitor for identifier signals from the computing device 102, and transmit reply signals to establish communication connections. The host connection module 310 may establish communication connections with the computing device 102 using a variety of protocols, depending on the RF communication technology of the computing device 102.

In various embodiments, the host connection module 310 may have the ability to determine the distance between the host wireless interface device 300 and the computing device 102. In at least one of such embodiments, the host connection module 310 may determine this distance based on the strength of the signal received from the particular host wireless interface device. In other embodiments in which both the host wireless interface device 300 and the computing device 102 have global positioning system (GPS) hardware and/or software, the host wireless interface device 300 may rely on GPS position data to determine its distance to the particular host wireless interface device. Nevertheless, it will be appreciated that the above embodiments of distance determination is illustrative rather than limiting, and that a combination of one or more of the above distance determination techniques, as well as other distance determination techniques, may be implemented by the host connection module 310 in additional embodiments.

In at least one embodiment, the host connection module 310 may automatically connect with the computing device 102 when the host wireless interface device 300 is within a predetermined distance (e.g., 25 feet) of the computing device 102. As further described below, the host connection module 310 may also disconnect the host wireless interface device 300 from the computing device 102 on an automatic basis or in response to a user input.

The device connection module 312 may use the wireless interface module 308 to detect and communicate with other wireless devices, such as other host wireless interface devices and dependent wireless interface devices. In at least one embodiment, the host device connection module 312 may detect another wireless device by broadcasting an identifier signal, and monitoring for reply signals from the other wireless device for establishing communication connections. In other embodiments, the device connection module 312 may monitor for identifier signals from the other wireless device, and transmit reply signals to establish communication connections. Moreover, the device connection module 312 may establish communication connections with the other wireless devices using a variety of protocols, depending on the RF communication technology used by each of the other wireless devices. Once communication is establish, the device communication module 312 may also automatically exchange device data with the other wireless devices. The device data may include device identifiers, device model numbers, device type (e.g., host wireless interface device or dependent wireless interface device), device software and/or hardware versions, current status of connection with a SRC computer, and/or the like.

In various embodiments, the device connection module 312 may have the ability to determine the distance between the host wireless interface device 300 and each of the other wireless devices. In at least one of such embodiments, the device connection module 312 may determine this distance based on the strength of the signal received from the other wireless device, such as a host wireless interface device or a dependent wireless interface device. In other embodiments in which both the host wireless interface device 300 and the other wireless device have global positioning system (GPS) hardware and/or software, the host wireless interface device 300 may rely on GPS position data to determine its distance to the particular host wireless interface device. Nevertheless, it will be appreciated that the above embodiments of distance determination are illustrative rather than limiting, and that a combination of one or more of the above distance determination techniques, as well as other distance determination techniques, may be implemented by the device connection module 312 in additional embodiments.

In at least one embodiment, the device connection module 312 may automatically connect with another wireless device (e.g., another host wireless interface device or dependent wireless interface device) when the host wireless interface device 300 is within a predetermined device connection distance (e.g., three feet) of the other wireless device. As further described below, the device connection module 312 may also disconnect the host wireless interface device 300 from another wireless device on an automatic basis or in response to a user input.

The user interface module 314 may enable a user to control the behavior of the host connection module 310 and/or the device connection module 312. In various embodiments, the user interface module 314 may generate a user interface menu and/or indicators that show the host wireless interface device 300 as connecting to the computing device 102 or another wireless device. In turn, the user interface device 314 may receive one or more user inputs that approve the connection or aborts the connection. For example, in an instance in which the host wireless interface device 300 is the monitor 106 described in FIG. 1, the user interface module 314 may provide an on-screen display (OSD) menu that indicates the host wireless interface device 300 is connecting to a computing device 102. The OSD menu may also present a user with the option of confirming the connection or aborting the connection. Accordingly, the user may use control keys located on the monitor 106 to either confirm the connection or abort the connection to the user interface module 314. In such an example, the user interface module 314 may cause the host wireless interface device 300 to default to connecting with the computing device 102 when it does not receive an abort command from the user within a predetermined amount of time.

In another example in which the host wireless interface device 300 is the keyboard 120 further described in FIG. 1, the user interface module 314 may indicate to the user that it is in the process of connecting to another wireless device (e.g., a dependent wireless interface device) via a dedicated signal light. Moreover, the keyboard 120 may include a specific key that the user may press to confirm to the user interface module 314 the connection to the other wireless device, as well as another specific key for indicating to the user interface module 314 to abort the connection. In such an example, the user interface module 314 may cause the host wireless interface device 300 to default to connecting with the dependent wireless interface device when it does not receive an abort command from the user within a predetermined amount of time.

The user interface module 314 may further pass any user input for interacting with the desktop sessions 134(1)-134(n) to the computing device 102 via the host connection module 310. For example, in the instance where the host wireless interface device 300 is the keyboard 120, the user interface module 314 may convey key stroke data entered by a user to the computing device 102.

The authentication module 316 may provide authentication information to the computing device 102 so that the host wireless interface device 300 may establish a communication connection with the computing device 102. In some embodiments, the authentication module 316 may provide device characteristics. For example, the device characteristics may include, but are not limited to, a device identifier, an encrypted key that is stored on the host wireless interface device, and/or the like. The authentication module 316 may automatically provide the one or more device characteristics as a part of connection establishment procedure. Alternatively, the authentication module 316 may provide one or more device characteristics when the user inputs a command via the user interface module 314.

In other embodiments, the authentication module 316 may provide user characteristics. The user characteristics may include, but are not limited to, a user name, a password, an electronic certificate, biometric characteristics, and/or the like. Accordingly, in various embodiments, the authentication module 316 may cause the user interface module 314 to prompt a user for the appropriate user characteristic. For example, in an instance in which the host wireless interface device 300 is the monitor 106 described in FIG. 1, the authentication module 316 may cause the user interface module 314 to indicate to a user that the user is to enter a password via control keys on the monitor 106.

The authentication module 316 may further authenticate dependent wireless interface devices that attempt to establish communication connections with the host wireless interface device. In such embodiments, the authentication module 316 may store information regarding the proper authentication information that it expects from different types of dependent wireless interface devices in the data storage 318. Thus, the authentication module 316 may prompt a dependent wireless interface device for the authentication information. For example, in an instance where the host wireless interface device 300 is the digital video camera 128, the authentication module 316 of the device may dictate that a dependent wireless interface device that is a keyboard is to be authenticated via the optically scanning of a barcode that is located on the keyboard. As such, the barcode of the keyboard may store a device identifier.

The data storage module 318 may store data related to the various wireless devices (e.g., the computing device 102, other host wireless interface devices, and/or other dependent wireless interface devices). Such stored data may include current connections with such wireless devices, as well as prior connection histories with the wireless devices. The stored data may further include device characteristics and/or previously entered user characteristics, as well as other data for the operation of the host wireless interface device 300.

Example Dependent Wireless Interface Device Components

Figure 4:
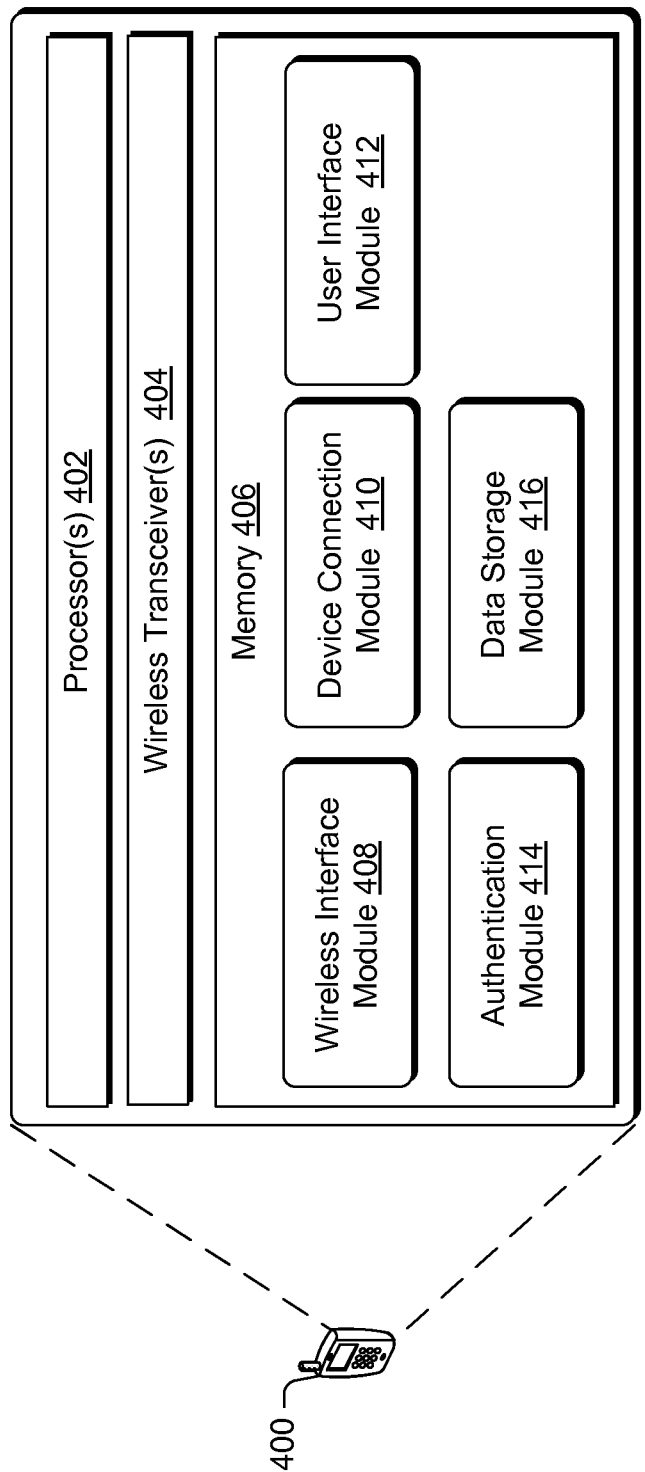
FIG. 4 is a block diagram that illustrates selected components of a dependent wireless interface device that connects to a host wireless interface device.

FIG. 4 is a block diagram that illustrates selected components of a dependent wireless interface device 400 that connects to a host wireless interface device. The dependent wireless interface device 400 may include one or more processors 402, one or more wireless transceivers 404, and a memory 406. The wireless transceivers 404 may be capable of transmit and receive data via a variety of RF communication technology. These RF communication technology may include, but is not limited to, wireless cellular network, Wireless Fidelity (Wifi), World Interoperability for Microwave Access (WiMax), Bluetooth®, Wireless Universal Serial Bus (USB), Ultra-wideband (UWB), and/or the like.

The memory 406 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 406 may store the selected components of the dependent wireless interface device 400. The components may be in the form of routines, programs, objects, and data structures that cause the performance of particular tasks or implement particular abstract data types. In various embodiments, the components may include wireless interface module 408, a device connection module 410, a user interface module 412, an authentication module 414, and a data storage module 416. In various embodiments, the modules 408-416 may function in substantially same way as their counterpart modules in the host wireless interface device 300.

Nevertheless, the modules 408-416 may facilitate interfacing with a host wireless interface device, rather than the computing device 102. For example, the authentication module 414 may communicate with the authentication module 316 to authenticate the dependent wireless interface device 400 to the host wireless interface device 300. Moreover, the dependent wireless interface device 400 may lack a host connection module. Accordingly, the dependent wireless interface device 400 may rely on a communication connection with a host wireless interface device to exchange data with the computing device 102.

While some functionality of the modules of the computing device 102 and the various wireless devices have been described above, it will be appreciated that additional functionality of such modules may be further described below with regard to the processes 500-1000 of FIGS. 5-10.

Example Processes

FIGS. 5-10 describe various example processes for implementing the automatic connection of multiple wireless device groups to a single computing device. The example processes are described in the context of the environment of FIG. 1, but are not limited to that environment. The order in which the operations are described in each example process is not intended to be construed as a limitation, and any number of the described blocks can be combined in any order and/or in parallel to implement each process. Moreover, the blocks in the FIGS. 5-10 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented. Further, the processes of FIGS. 5-10 may, but need not necessarily, be implemented using the architecture of FIGS. 1-4. Consequently, by way of explanation, and not limitation, the processes of FIGS. 5-10 are described in the context of FIGS. 1-4.

Figure 5:
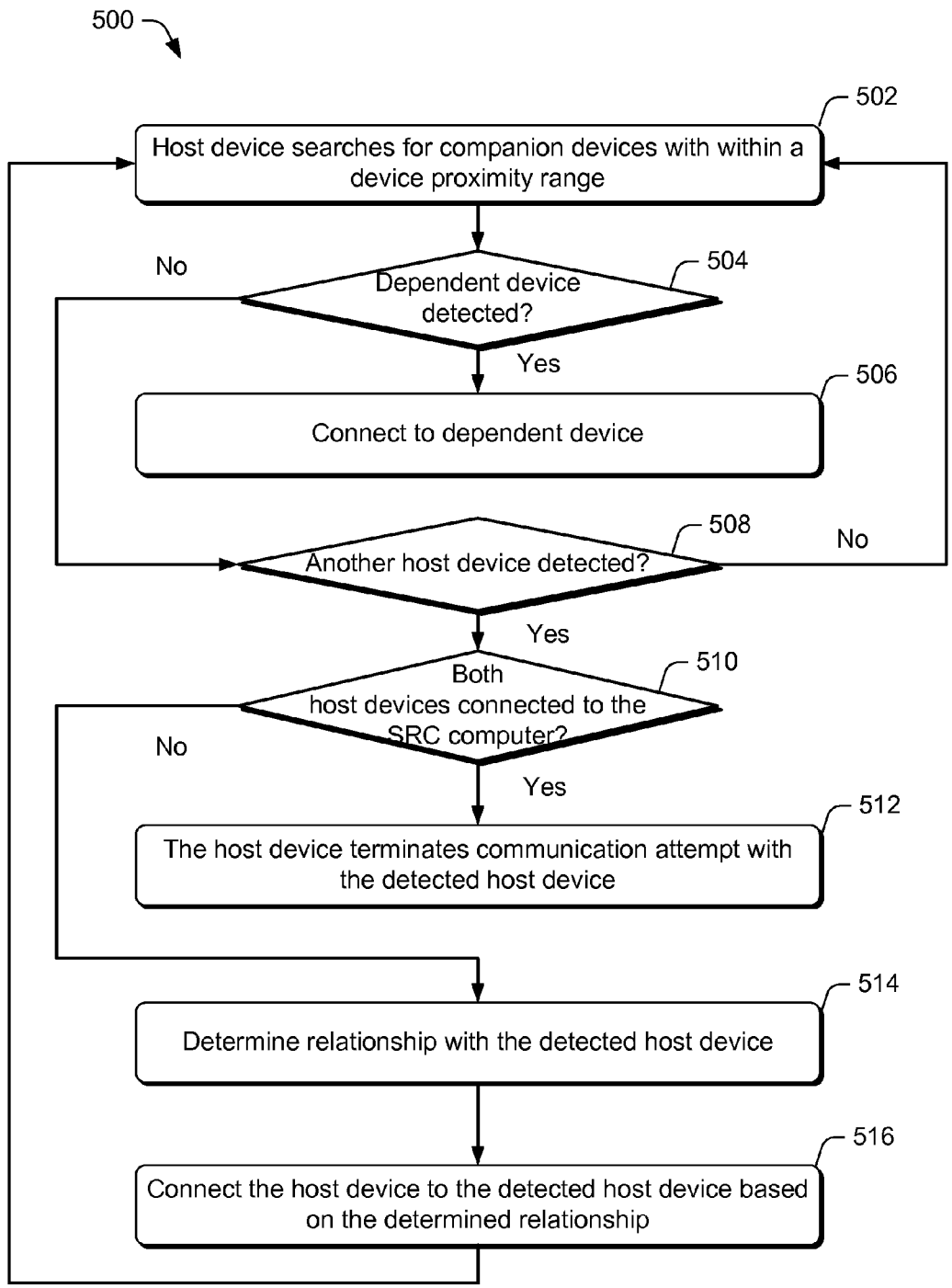
FIG. 5 is a flow diagram that illustrates an example process for a host wireless interface device to connect to one or more companion devices to form a wireless device group.

FIG. 5 is a flow diagram that illustrates an example process 500 for a host wireless interface device to connect to one or more companion devices to form a wireless device group.

At block 502, the device connection module 312 of a host wireless interface device 300 may search for companion devices with a device proximity range. A companion device may be a dependent wireless interface device 400 or another host wireless interface device. The device proximity range may be a predetermined device connection distance at which the host wireless interface device 300 may automatically establish a communication connection with one or more companion devices.

At decision block 504, the device connection module 312 may determine whether a dependent wireless interface device, such as the dependent wireless interface device 400, is detected with the device proximity range. If the device connection module 312 detects that a dependent wireless interface device is within the device proximity range ("yes" at decision block 504), the process 500 may proceed to block 506. At block 506, the host wireless interface device may establish a communication connection with the dependent wireless interface device. However, if the device connection module 312 does not detect that a dependent wireless interface device is within the device proximity range ("no" at decision block 504), the host wireless interface device 300 may proceed to decision block 506.

At decision block 508, the device connection module 312 may determine whether another host wireless interface device is detected within the device proximity range. If the device connection module 312 detects that another host wireless interface device is within the device proximity range ("yes" at decision block 506), the process 500 may proceed to decision block 510.

At decision block 510, the device connection module 312 may communicate with the corresponding device connection module of the detected host wireless interface device to determine whether both host wireless interface devices are already connected to a SRC computer (e.g., computing device 102). If the device connection module 312 determines that both host wireless communication devices are already connected to the computing device 102, the process 500 may proceed to block 512.

At block 512, the device connection module 312 may terminate the attempt to establish a communication connection with the detected host wireless communication device. However, if the device connection module 312 determines that not all of the host wireless interface devices are connected to the computing device 102 ("no" at decision block 510), the process 500 may proceed to block 514.

At block 514, the device connection module 312 may determine its connection relationship with the other host wireless interface device. In various embodiments, the device connection module 312 may determine that the host wireless interface device 300 is to connect to the other host wireless interface device as a dependent wireless interface device. Alternatively, the device connection module 312 may determine that the other host wireless interface device is to be connected to the host wireless interface device 300 as a dependent wireless interface device. This relationship determination may be further illustrated in FIG. 6. Once the device connection module 312 has made such a relationship determination, the process 500 may proceed to decision block 516.

At block 516, the device connection module 312 of the host wireless interface device 300 may connect the host wireless interface device to the other host wireless interface device based on the determined relationship. Subsequently, the process 500 may loop back to block 502 so that the host wireless interface device 300 may search for additional companion devices.

Figure 6A:
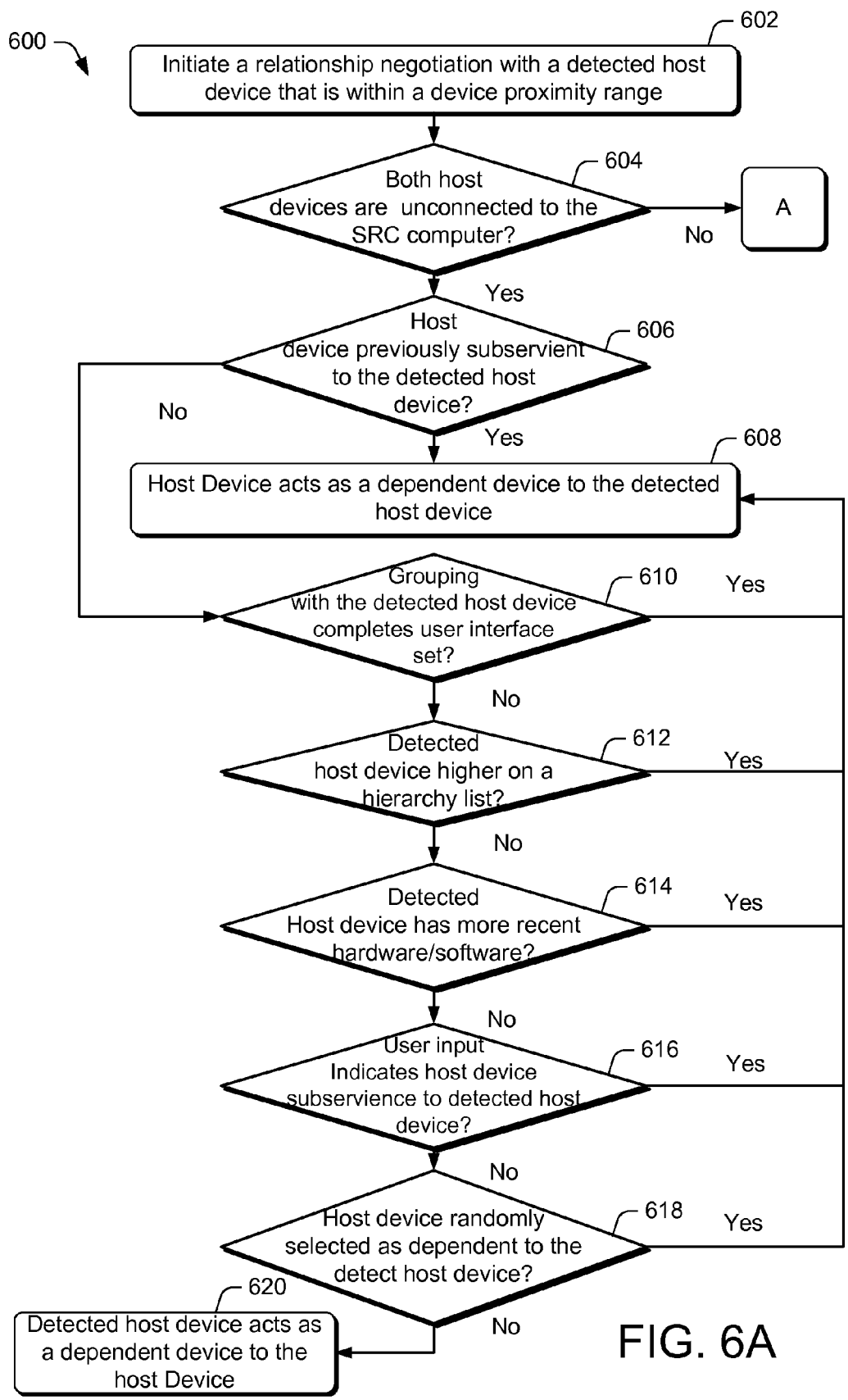
FIGS. 6A-6B show a flow diagram that illustrates an example process for a host wireless interface device to determine its relationship with another host wireless interface device.
Figure 6B:
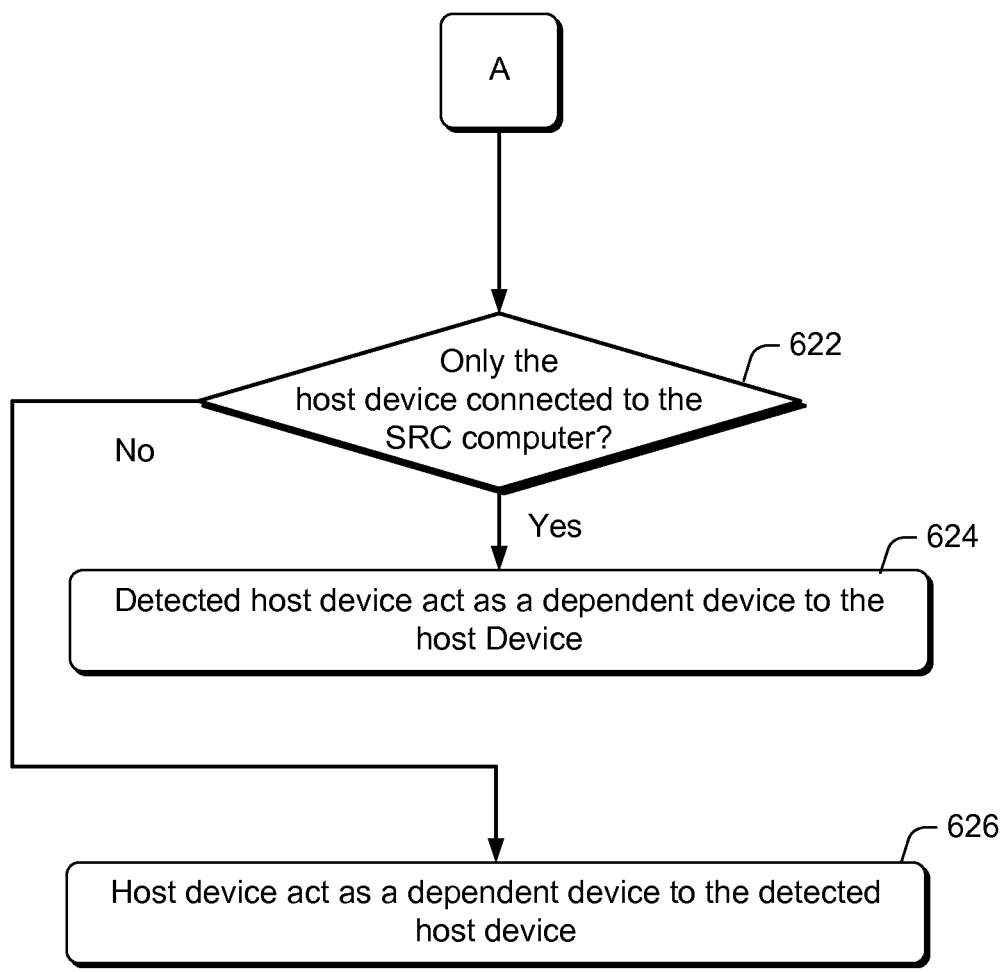

FIGS. 6A-6B show a flow diagram that illustrates an example process 600 for a host wireless interface device to determine its relationship with another host wireless interface device. The process 600 may further illustrate block 514 of FIG. 5.

At block 602, the device connection module 312 of the host wireless interface device 300 may initiate a relationship negotiation with a detected host wireless interface device that is within a device proximity range. The device proximity range may be a predetermined device connection distance at which the host wireless interface device 300 may automatically establish a communication connection with one or more companion devices.

At decision block 604, the device connection module 312 may determine whether the host wireless interface device 300 and the detected host wireless interface device are connected to a shared resource computing (SRC) computer, such as the computing device 102. If the device connection module 312 determines that both of host wireless interface devices are unconnected to the computing device 102 ("yes" at decision block 604), the process 600 may proceed to decision block 606.

At decision block 606, the device connection module 312 may determine whether the host wireless interface device 300 was previously subservient to the detected wireless host device. In other words, the device connection module 312 may determine whether the wireless host device 300 has previously acted as a dependent wireless interface device to the detected host wireless interface device. If the device connection module 312 determines that the host wireless interface device 300 was previously subservient to the detected host wireless interface device ("yes" at decision block 606), the process 600 may proceed to block 608.

At block 608, the device connection module 312 may cause the host wireless interface device 300 to establish a communication connection to the detected host wireless interface device as a dependent wireless interface device. In other words, the host wireless interface device 300 may temporarily suspend its ability to directly connect to the computing device. Instead, the host wireless interface device 300 may rely on the detected host wireless interface device to exchange data with the computing device 102.

In some embodiments, a user may provide an input to the device connection module 312 that causes the device connection module 312 to clear its automatic subservient relationship via the user interface module 314. For example, in the instance in which the host wireless interface device 300 is the monitor 106 described in FIG. 1, the monitor 106 may have retained a setting that indicates that it is subservient to another host wireless interface device. Accordingly, the device connection module 312 may provide an OSD menu option that clears the subservience of the monitor 106 to the other host wireless interface device.

Returning to decision block 606, if the device connection module 312 determines that the host wireless interface device 300 was not previously subservient to the detected host wireless interface device ("no" at decision block 606), the process may proceed to decision block 610.

At decision block 610, the device connection module 312 may determine whether a grouping the host wireless interface device 300 with the detected host wireless interface device complete a user interface set. In various embodiments, a user interface set is a group of devices that provides with the user with the ability to both view data and input data. For example, the detected host wireless interface device may be a keyboard that already forms a wireless device group with a dependent wireless interface device that is a mouse. In such an example, if the host wireless interface device 300 is a monitor, the device connection module 312 may determine that grouping the host wireless interface device 300 with the detected host wireless interface device completes a user interface set. The complete user interface set may enable the user to interface with one or more desktop sessions 134(1)-134(n) of the shared resource computing environment 132. In another example, the detected host wireless interface device may be a portable music player, and the host wireless interface device 300 may be a set of speakers. In various embodiments, the actual device types that constitute each user interface set may be stored as data in the data storage module 318.

Accordingly, at decision block 610, if the device connection module 312 determines that the grouping of the host wireless interface device 300 with the detected host wireless interface device completes a user interface set ("yes" at decision block 610), the process 600 may proceed back to block 608. At block 608, the host wireless interface device 300 may act as a dependent wireless interface device to the detected host wireless interface device.

Returning to decision block 610, if the device connection module 312 determines that the grouping of the host wireless interface device 300 with the detected host wireless does not complete a user interface set ("no" at decision block 610), the process 600 may proceed to decision block 612.

At block decision 612, the device connection module 312 may determine whether the detected host wireless interface device is higher, that is, has precedence as a host wireless interface device on a hierarchy list, than the host wireless interface device 300. For example, the hierarchy list may dictate that for a group of host wireless interface devices, a monitor has the highest precedence on the list, a keyboard has medium precedence on the list, while the digital camera has the lowest precedence on the hierarchy list. In this way, such a hierarchy list may serve to enable host wireless interface devices to be deployed according to most common expected usage, technology sophistication, convenience, and/or the like. In various embodiments, the hierarchy list may be stored as data in the data storage module 318 of the host wireless interface device 300.

Thus, if the device connection module 312 determines that the detected host wireless interface device has higher precedence on the hierarchy list than the host wireless interface device 300 ("yes" at decision block 612), the process 600 may proceed back to block 608. At block 608, the host wireless interface device 300 may act as a dependent wireless interface device to the detected host wireless interface device. However, if the device connection module 312 determines that the detected host wireless does not have higher precedence on the hierarchy list ("no" at decision block 612), the process 600 may proceed to decision block 614.

At decision block 614, the device connection module 312 may determine whether the detected host wireless interface device is equipped with more recent software and/or hardware than the host wireless interface device 300. In some embodiments, the device connection module 312 may make this determination based on the versions of the firmware that reside in the host wireless interface devices being compared.

For example, the device connection module 312 may be a firmware that is of a newer version than the corresponding device connection module in the detected host wireless interface device. In other embodiments, the device connection module 312 may compare the hardware revisions of the various components (e.g., processors, transceivers) to determine which host wireless interface device has more updated hardware components. Accordingly, the device connection module 312 may determine that one host wireless interface device is more advanced than another host wireless device based on at least one of hardware version or software version.

Thus, if the device connection module 312 determines that the detected host wireless interface device has more advanced (e.g., more recent version) hardware and/or software than the host wireless interface device 300 ("yes" at decision block 614), the process 600 may proceed back to block 608. At block 608, the host wireless interface device 300 may act as a dependent wireless interface device to the detected host wireless interface device. However, if the device connection module 312 determines that the detected host wireless does not have more advanced hardware and/or software ("no" at decision block 612), the process 600 may proceed to decision block 616.

At decision block 616, the device connection module 312 may determine whether the user has provided an input via the user interface 314 that the host wireless interface device 300 is to be subservient to the detected host wireless interface device. In various embodiments, the device connection module 312 may be configured to only provide a predetermined time period (e.g., 60 seconds) from the detection of the other host wireless interface device during the initial relationship negotiation for the user to enter the appropriate user input.

Thus, if the device connection module 312 determines that the user provide an input that indicates that the host wireless interface device 300 is to be subservient to the detected host wireless interface device within the predetermined time period ("yes" at decision block 616), the process 600 may proceed back to block 608. At block 608, the host wireless interface device 300 may act as a dependent wireless interface device to the detected host wireless interface device. However, if the device connection module 312 determines that no such user input is received within the predetermined time period ("no" at decision block 616), the process 600 may proceed to decision block 620.

At decision block 618, the device connection module 312 may cooperate with the device connection module of the detected host wireless interface device to randomly assign one of the wireless host devices as a dependent device of the other host wireless interface device. Thus, if the device connection module 312 randomly assigns the host wireless interface device 300 as a dependent device of the detected host wireless interface device ("yes" at decision block 616), the process 600 may proceed to block 608. At block 608, the host wireless interface device 300 may act as a dependent wireless interface device to the detected host wireless interface device. However, if the device connection module 312 randomly assigns the detected host wireless interface device as a dependent device of the host wireless interface device 300 ("no" at decision block 616), the process 600 may proceed to block 620.

At block 620, the device connection module 312 of the host wireless interface device 300 may cooperatively establish a communication connection with a corresponding module on the detected host wireless interface device. Such a communication connection may cause the detected host wireless interface device to act as a dependent device to the host wireless interface device 300.

Returning to decision block 604, if the device connection module 312 determines that at least one of the host wireless interface device 300 or the detected host wireless interface device is connected to the computing device 102 ("no" at decision block 604), the process 600 may proceed to block 622 of FIG. 6B.

At decision block 622, if the device connection module 312 determines that only the host wireless interface device 300 is connected to the computing device 102 ("yes" at decision block 622), the process 600 may proceed to block 624. At block 624, the device connection module 312 of the host wireless interface device 300 may establish a communication connection with the detected host wireless interface device. Such a communication connection may cause the detected host wireless interface device to act as a dependent device to the host wireless interface device 300.

However, if the device connection module 312 determines that this is not the case ("no" at decision block 624), it would mean that only the detected wireless device is connected to the computing device 102. Accordingly, the process 600 may proceed to block 626. At block 626, the device connection module 312 may cause the host wireless interface device 300 to establish a communication connection to the detected host wireless interface device as a dependent wireless interface device.

Figure 7:
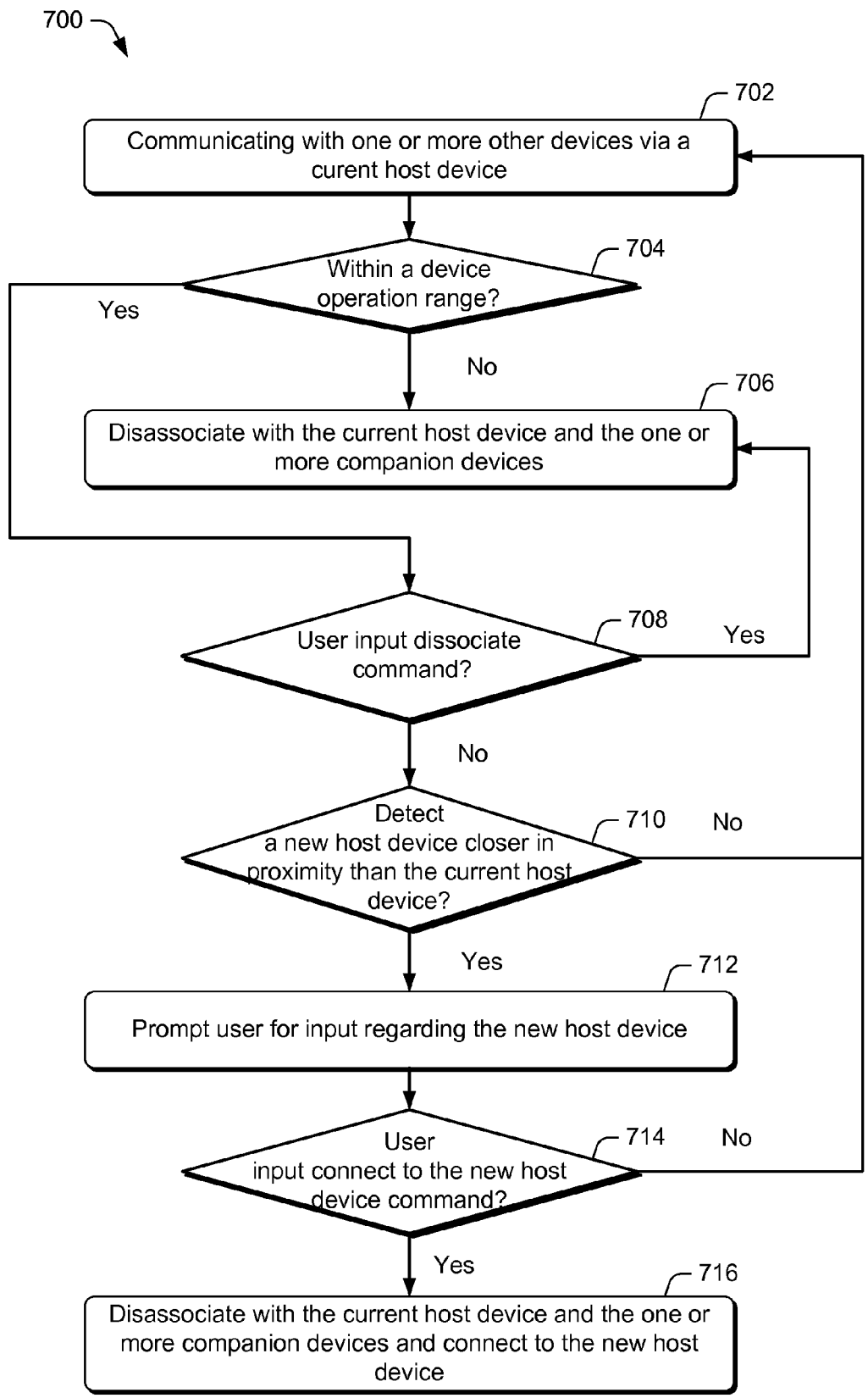
FIG. 7 is a flow diagram that illustrates an example process for a dependent wireless interface device to dissociate with a host wireless interface device.

FIG. 7 is a flow diagram that illustrates an example process 700 for a dependent wireless interface device to dissociate with a host wireless interface device. At block 702, a dependent wireless interface device, such as the dependent wireless interface device 400, may be in communication with one or more other devices via a host wireless interface device (i.e., current host wireless interface device). For example, the dependent wireless interface device 400 may have previously established a communication connection with the host wireless interface device 300. In such an example, the dependent wireless interface device 400 may have used its device connection module 410 to interact with the device connection module 312 of the host wireless interface device 300 to establish such a communication connection. Accordingly, the dependent wireless interface device may exchange data with the SRC computer (e.g., computing device 102), as well as other dependent wireless interface devices via the host wireless interface device 300.

At decision block 704, the device connection module 410 of the dependent wireless interface device 400 may determine whether the dependent wireless interface device 400 is within a device operation range of a host wireless interface device to which it has established a communication connection. In various embodiments, the device operation range may be a predetermined distance that is less than or equal to the predetermined device connection distance between the dependent wireless interface device 400 and the connected host wireless interface device.

Thus, if the device connection module 410 determines that the dependent wireless interface device 400 is no longer within the device operation range of host wireless interface device that it has established a communication connection with ("no" at decision block 704), the process 700 may proceed to block 706. At block 706, the device connection module 410 may terminate the communication connection between the dependent wireless interface device 400 with the current connected host wireless interface device.

However, if the device connection module 410 determines at block 704 that the dependent wireless interface device is still within the device operation range of the connected host wireless interface device ("yes" at decision block 706), the process 700 may proceed to decision block 708.

At decision block 708, the device connection module 410 may determine whether a user input to dissociate, or terminate the communication connection between the dependent wireless interface device 400 and the current host wireless interface device 300 is received. In some embodiments, the user may provide such an input to the device connection module 410 via the user interface module 412, which may in turn receive the input from one or more hardware switches and/or software menus on the dependent wireless interface device 400. In other embodiments, such user input may be received by the device connection 312 of the host wireless interface device 300 in a similar manner. Accordingly, if the device connection module 410 (or the device connection module 312) determines an input to terminate the communication connection is received ("yes" at decision block 708), the process 700 may loop back to block 706.

At block 706, the device connection module 410 may terminate the communication connection between the dependent wireless interface device 400 with the current connected host wireless interface device. However, if the device connection module 410 determines that no input to terminate the communication connection is received ("no" at decision block 708), the process 700 may proceed to decision block 710.

At decision block 710, the device connection module 410 may determine whether it has detected a new host wireless interface device that is in closer proximity to the dependent wireless interface device 400 than the current host wireless interface device to which the dependent wireless interface device 400 has already established a communication connection. If the device connection module 410 determines that no closer host wireless interface device has been detected ("no" at decision block 710), the process 700 may loop back to block 702. At block 702, the dependent wireless interface device 400 may maintain its existing communication connection with the various devices.

However, if the device connection module 410 determines that a closer host wireless interface device has been detected ("yes" at decision block 710), the process 700 may proceed to block 712. At block 712, the device connection module 410 may prompt the user for input regarding whether the dependent wireless interface device 400 is to switch to a communication connection with the detected host wireless interface device. In various embodiments, the device connection module 410 may prompt for the user input via the user interface module 412, and may in turn receive the user input from one or more hardware switches and/or software menus on the dependent device 400.

Thus, at decision block 714, if the device connection module 410 does not receive an input that commands the dependent wireless interface device 400 to terminate its current communication connection and establish a new communication connection with the newly detected host device ("no" at decision block 714), the process 700 may loop back to block 702. At block 702, the dependent wireless interface device 400 may maintain its existing communication connection with the various devices.

However, if the device connection module 410 receives an input that commands the dependent wireless interface device 400 to terminate its current communication connection and establish a new communication connection with the newly detected host wireless interface device ("yes" at decision block 714), the process 700 may proceed to block 716. At block 716, the device connection module 410 may terminate the established communication connection with the current host wireless interface device, and establish a new communication connection with the newly detected host wireless interface device.

Figure 8:
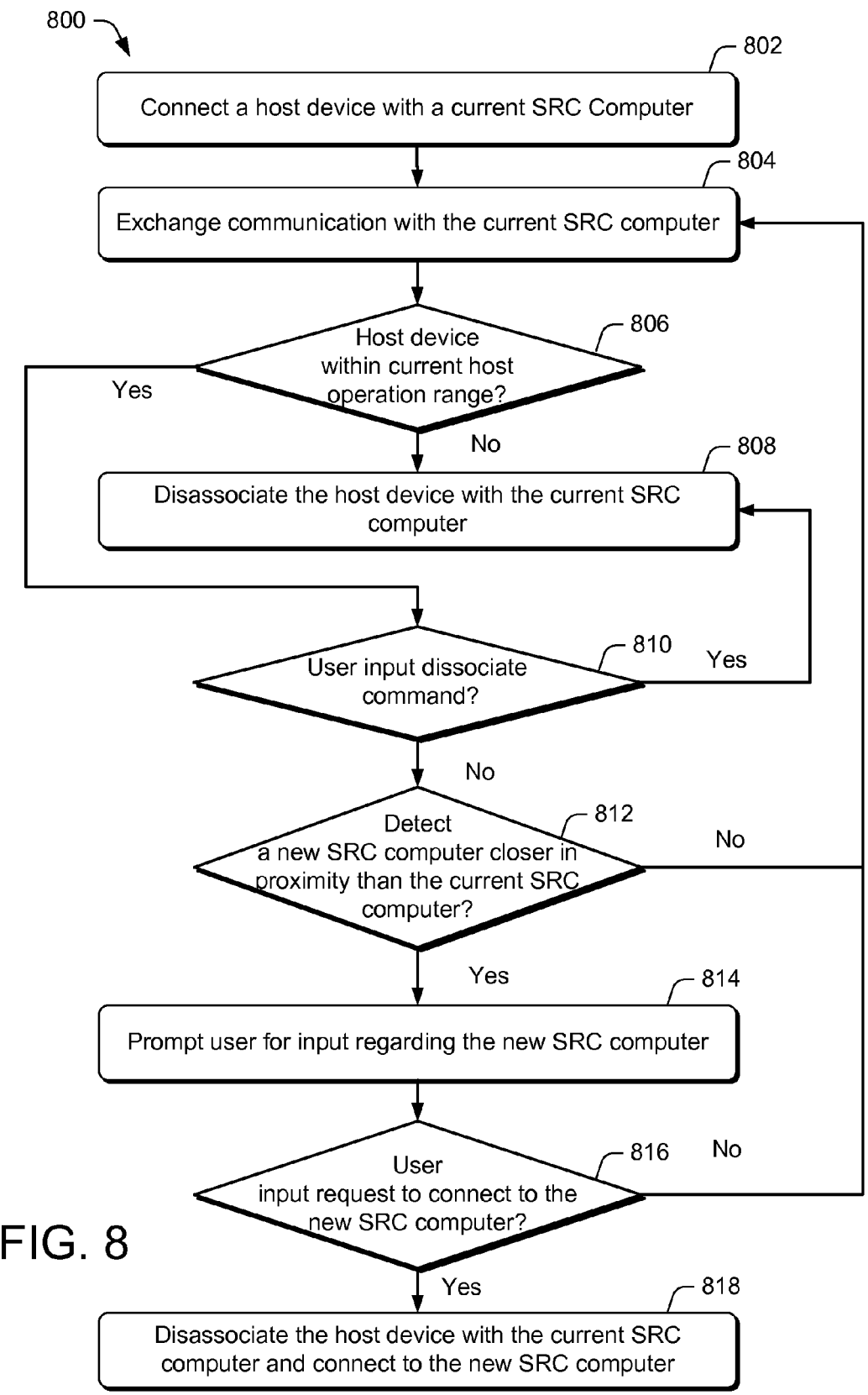
FIG. 8 is a flow diagram that illustrates an example process for a host wireless interface device to dissociate its corresponding wireless device group from a shared resource computing device.

FIG. 8 is a flow diagram that illustrates an example process 800 for a host wireless interface device to dissociate its corresponding wireless device group from a shared resource computing device. At block 802, a host wireless interface device of a wireless device group, such as the host wireless interface device 300, may establish a communication connection to a current SRC computer (e.g., computing device 102). The wireless device group may further include one or more dependent wireless interface devices that exchange data with the computing device 102 via the host wireless interface device 300. In some embodiments, the host wireless interface device 300 may use its host connection module 110 to detect and initiate the communication connection with the computing device 102. However, in other embodiments, the computing device 102 may use its connection module 212 to detect and initiate the communication connection with the host wireless interface device 300. In these embodiments, the establishment of the communication may further include authentication of the host wireless interface device 300 by the computing device 102. The authentication may be facilitated by the device authentication module 214 of the computing device 102 and the authentication module 316 of the host wireless interface device 300.

At block 804, the various wireless devices of the wireless device group may exchange communication with the computing device 102. For example, the wireless device group may enable a user to interact with desktop sessions 134(1)-134(n). The desktop sessions 134(1)-134(n) may be part of the shared resource computing environment 132 that is implemented on the computing device 102.

At decision block 806, the host connection module 310 may determine whether the host wireless interface device 300 is within a host operation range of the computing device 102 to which it has established a communication connection. In various embodiments, the host operation range may be a predetermined distance that is less than or equal to the predetermined host connection distance between the host wireless interface device 300 and the computing device 102.

Thus, if the host connection module 310 determines that the host wireless interface device 300 is no longer within the host operation range of the computing device 102, ("no" at decision block 804), the process 800 may proceed to block 806. At block 808, the host connection module 110 may dissociates the host wireless interface device 300 from the computing device 102. In other words, terminate the communication connection between the host wireless interface device 300 and the computing device 102.

However, if the host connection module 310 determines at decision block 806 that the host wireless interface device 300 is still within the host operation range of the computing device 102 ("yes" at decision block 806), the process 800 may proceed to block 810.

At block 810, the host connection module 310 may determine whether a user input to dissociate the host wireless interface device 300 with the current SRC computer, that is, computing device 102, is received. In some embodiments, the user may provide such an input to the host connection module 310 via the user interface module 314, which may in turn receive the input from one or more hardware switches and/or software menus on the host wireless interface device 300. In other embodiments, such user input may be received by the connection module 212 of the computing device 102 in a similar manner. For example, the administrator 136 may provide such a user input via the administrative session 138.

Accordingly, if the host connection module 310 (or the connection module 212) determines an input to terminate the communication connection is received ("yes" at decision block 810), the process 800 may loop back to block 808. At block 808, the host connection module 110 may dissociates the host wireless interface device 300 from the computing device 102. However, if the host connection module 310 determines that no input to terminate the communication connection is received ("no" at decision block 810), the process 800 may proceed to decision block 812.

At decision block 812, the host connection module 310 may determine whether it has detected a new SRC computer that is in closer proximity to the host wireless interface device 300 than the currently connected SRC computer, that is, the computing device 102. If the host connection module 310 determines that no closer SRC computer has been detected ("no" at decision block 812), the process 800 may loop back to block 804. At block 804, the host wireless interface device 300 may maintain its existing communication connection with the computing device 102.

However, if the host connection module 310 determines that a closer SRC computer has been detected ("yes" at decision block 812), the process 800 may proceed to block 814. At block 814, the host connection module 310 may prompt the user for input regarding whether the host wireless interface device 300 is to switch to a communication connection with the newly detected SRC computer. In various embodiments, the host connection module 310 may prompt for the user input via the user interface module 314, and may in turn receive the user input from one or more hardware switches and/or software menus of the host wireless interface device 300.

Thus, at decision block 816, if the host connection module 310 does not receive an input that commands the host wireless interface device 300 to terminate its current communication connection and establish a new communication connection with the newly detected SRC computer ("no" at decision block 816), the process 800 may loop back to block 804. At block 804, the host wireless interface device 300 may maintain its existing communication connection with the computing device 102.

However, if the host connection module 310 receives an input that commands the host wireless interface device 300 to terminate its current communication connection and establish a new communication connection with the newly detected host wireless interface device ("yes" at decision block 816), the process 800 may proceed to block 818. At block 818, the host connection module 310 may terminate the established communication connection with the computing device 102, and establish a new communication connection with the newly detected SRC computer.

Figure 9:
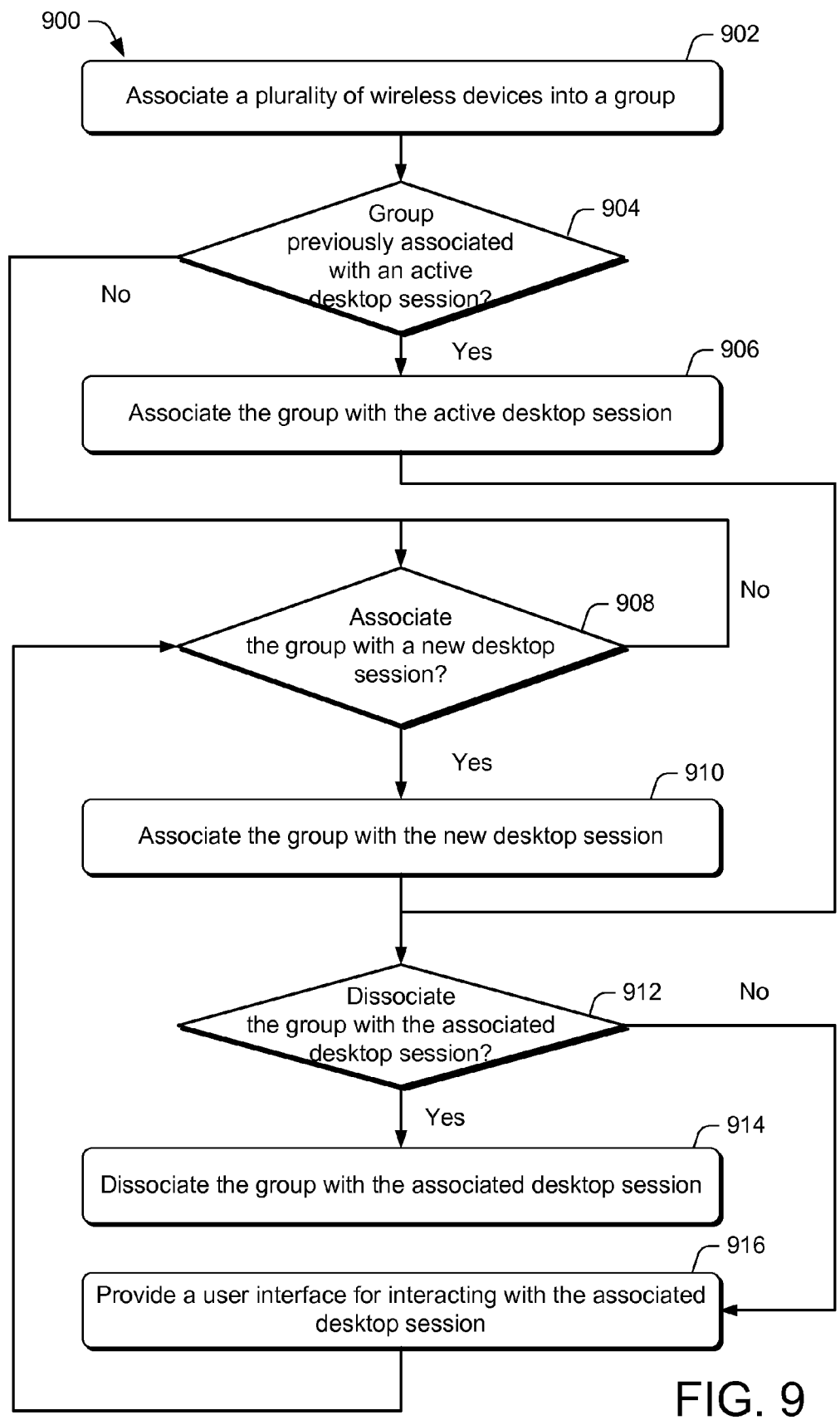
FIG. 9 is a flow diagram that illustrates an example process for associating and dissociating a wireless device group with a desktop session of the shared resource computing environment.

FIG. 9 is a flow diagram that illustrates an example process 900 for associating and dissociating a wireless device group with a desktop session of the shared resource computing environment.

At block 902, a user may associate a plurality of wireless devices into wireless device group. The wireless device group may include a host wireless interface device, such as the host wireless interface device 300, and one or more dependent wireless interface devices. The wireless device group may be formed when the host wireless interface device 300 and the one or more dependent wireless interface devices mutually establish communication connections when they are placed within a predetermined device connection distance with each other.

At block 904, once the wireless device group is formed, the host connection module 310 may determine whether the wireless device group was previously associated with, that is, used to interact with a desktop session of the shared resource computing environment 100. For example, the user may have previously used the wireless device group with a particular desktop session (e.g., desktop session 134(1)) that is now currently active. In some embodiments, the host connection module 310 of the host wireless interface device 300 may retain information regarding the association between the wireless device group and one or more past desktop session interactions in the data storage module 318.

Thus, if the host connection module 310 determines that the wireless group was previously associated with the currently active desktop session ("yes" at decision block 904), the process 900 may proceed to block 906. At block 906, the host connection module 310 may automatically associate the wireless device group with the currently active desktop session, so that the wireless device group may enable the user to interact with the currently active desktop session. Subsequently, the process 900 may proceed directly to decision block 912.

However, if the host connection module 310 determines that the wireless group was not previously associated with the currently actively desktop session ("no" at decision block 906), the process 900 may proceed to decision block 908.

At decision block 908, the host connection module 310 may determine whether the wireless device group is to be associated with a new desktop session. In various embodiments, the user may cause the host connection module 310 to automatically associate the wireless device group with a new desktop session by using the group to interact with a new desktop session. Thus, if the host connection module 310 determines that the wireless device group is to be associated with a new desktop session ("yes" at decision block 908), the process 900 may continue to block 910. At block 910, the host connection module 310 may associate the wireless device group with the new desktop session. However, returning to decision block 908, if the host connection module 310 determines that the wireless device group is not to be associated with a new desktop session ("no" at decision block 908), the process 900 may loop back and reenter decision block 908. In other words, the host connection module 310 may wait for the user to start interacting with a desktop session using the wireless device group.

Returning to decision 912, the host connection module 310 may determine whether the wireless device group is to be dissociated with the currently associated desktop session. In various embodiments, the desktop session module 218 may instantiate a desktop session that provide a group dissociation option as part of its menu interface. Accordingly, the user may use such a dissociation option to dissociate the wireless interface group. Thus, if the host connection module 310 determines that the wireless device group is to be dissociated with the currently associated desktop session ("yes" at decision block 912), the process 900 may proceed to block 914.

At block 914, the host connection module 914 may dissociate the wireless device group with the currently associated desktop session. In other words, the user may no longer use the wireless device group to exchange data with the dissociated desktop session.

However, if the host connection module 310 determines that the wireless device group is not to be dissociated with the currently associated desktop session ("no" at decision block 912), the process 900 may proceed to block 916. At block 916, the host wireless interface device 300 may continue to enable the user to use the wireless device group for interacting with the currently associated desktop session. Subsequently, the process 900 may loop back to decision block 908. At decision block 908, the host connection module 310 may once again determine whether the wireless device group is to be associated with a new desktop session.

Figure 10:
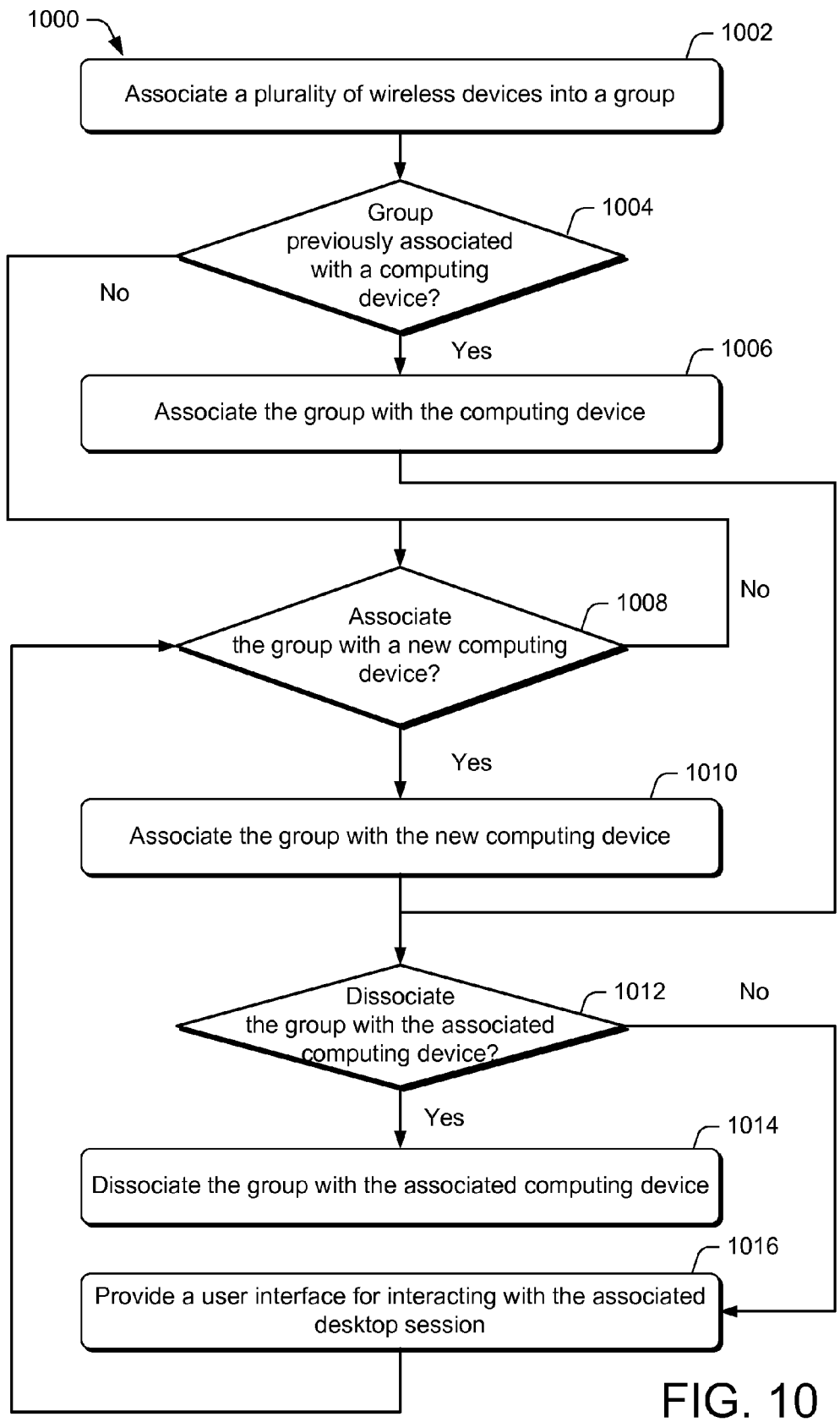
FIG. 10 is a flow diagram that illustrates an example process for associating and dissociating a wireless device group with a computing device.

FIG. 10 is a flow diagram that illustrates an example process 1000 for associating and dissociating a wireless device group with a computing device. At block 1002, a user may associate a plurality of wireless devices into wireless device group. The wireless device group may include a host wireless interface device, such as the host wireless interface device 300, and one or more dependent wireless interface devices. The wireless device group may be formed when the host wireless interface device 300 and the one or more dependent wireless interface devices mutually establish communication connections when they are placed within a predetermined device connection distance with each other.

At block 1004, once the wireless device group is formed, the host connection module 310 may determine whether the wireless device group was previously associated with, that is, used to interact with a particular computing device, such as the computing device 102, that is detected within the predetermined host connection distance. In some embodiments, the host connection module 310 of the host wireless interface device 300 may retain information regarding the association between the wireless device group and one or more past computing devices in the data storage module 318. Thus, if the host connection module 310 determines that the wireless group was previously associated with the detected computing device 102 ("yes" at decision block 1004), the process 1000 may proceed to block 1006. At block 1006, the host connection module 310 may automatically associate the wireless device group with the computing device 102, so that the wireless device group may enable the user to interact with the computing device 102. Subsequently, the process 1000 may proceed directly to decision block 1012.

However, if the host connection module 310 determines that the wireless group was not previously associated with the computing device 102 ("no" at decision block 1006), the process 1000 may proceed to decision block 1008.

At decision block 1008, the host connection module 310 may determine whether the wireless device group is to be associated with the computing device 102. In various embodiments, the host connection module 310 may automatically associate the wireless device group with the computing device 102 unless the user provides an input to the host connection module 310 that stops the association with a predetermined time period. In such embodiments, the user may provide such an input to the host connection module 310 via the user interface module 314, which may in turn receive the input from one or more hardware switches and/or software menus on the host wireless interface device 300.

Thus, if the host connection module 310 determines that the wireless device group is to be associated with the computing device 102 ("yes" at decision block 1008), the process 1000 may continue to block 1010. At block 1010, the host connection module 310 may associate the wireless device group with the computing device 102.

However, returning to decision block 1008, if the host connection module 310 determines that the wireless device group is not to be associated with the computing device 102 ("no" at decision block 1008), the process 1000 may loop back and reenter decision block 1008. In other words, the host connection module 310 may wait for the user to provide an input that associates the wireless device group with the computing device 102.

Returning to decision 1012, the host connection module 310 may determine whether the wireless device group is to be dissociated with the currently associated computing device 102. In various embodiments, the user may dissociate the wireless device group from the computing 102 by providing an input to the user interface module 314. Thus, if the host connection module 310 determines that the wireless device group is to be dissociated with the currently associated computing device 102 ("yes" at decision block 1012), the process 1000 may proceed to block 1014.

At block 1014, the host connection module 1014 may dissociate the wireless device group with the currently associated computing device 102. In other words, the wireless device group may no longer enable the user to exchange data with the dissociated computing device 102.

However, if the host connection module 310 determines that the wireless device group is not to be dissociated with the currently associated computing device ("no" at decision block 1012), the process 1000 may proceed to block 1016. At block 1016, the host wireless interface device 300 may continue to enable the user to use the wireless device group for interacting with the currently associated computing device 102. Subsequently, the process 1000 may loop back to decision block 1008. At decision block 1008, the host connection module 310 may once again determine whether the wireless device group is to be associated with a new computing device.

Example Computing Device

Figure 11:
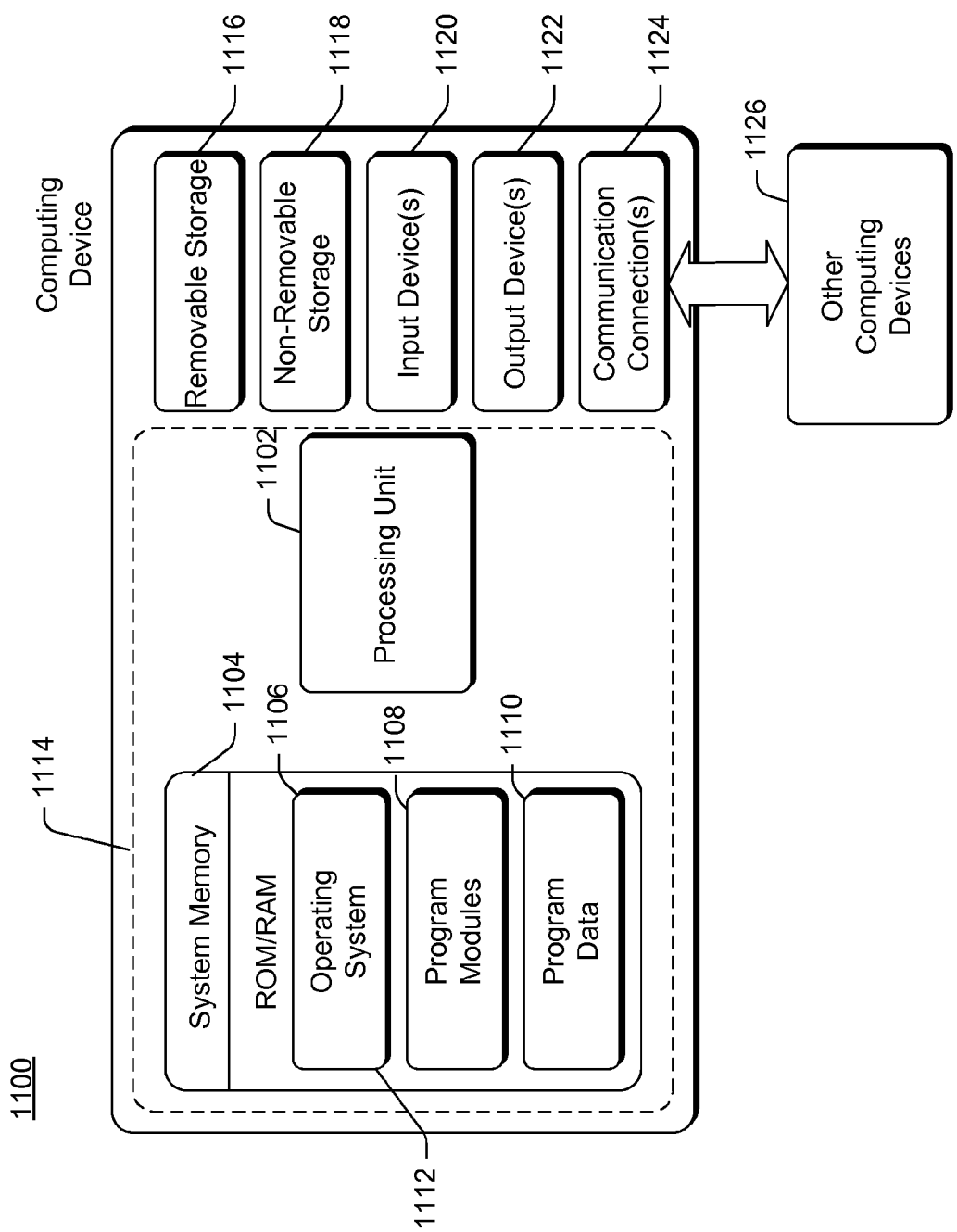
FIG. 11 is a block diagram that illustrates a representative computing device that may implement a shared resource computing architecture.

FIG. 11 illustrates a representative computing device 1100 that may implement the shared resource computing environment 132. For example, the computing device 1100 may be implemented as the computing device 102 described in FIG. 1. However, it will be readily appreciated that the techniques and mechanisms may be implemented in other computing devices, systems, and environments. The computing device 1100 shown in FIG. 11 is only one example of a computing device and is not intended to suggest any limitation as to the scope of use or functionality of the computer and network architectures.

In at least one configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination thereof. System memory 1104 may include an operating system 1106, one or more program modules 1108, and may include program data 1110. The operating system 1106 includes a component-based framework 1112 that supports components (including properties and events), objects, inheritance, polymorphism, reflection, and provides an object-oriented component-based application programming interface (API), such as, but by no means limited to, that of the .NET™ Framework manufactured by the Microsoft® Corporation, Redmond, Wash. The computing device 1100 is of a very basic configuration demarcated by a dashed line 1114. Again, a terminal may have fewer components but may interact with a computing device that may have such a basic configuration.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1116 and non-removable storage 1118. Computer storage media may include volatile and nonvolatile, removable and non-removable media implemented in any method or technology for storage of information, such as computer readable instructions, data structures, program modules, or other data. System memory 1104, removable storage 1116 and non-removable storage 1118 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 1100. Any such computer storage media may be part of device 1100. Computing device 1100 may also have input device(s) 1120 such as keyboard, mouse, pen, voice input device, touch input device, etc. Output device(s) 1122 such as a display, speakers, printer, etc. may also be included.

Computing device 1100 may also contain communication connections 1124 that allow the device to communicate with other computing devices 1126, such as over a network. These networks may include wired networks as well as wireless networks.

It is appreciated that the illustrated computing device 1100 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. The use of the shared resource computing environment and multiple wireless device groups may reduce or eliminate the cost and effort of maintaining a network environment for the purpose of concurrent collaboration on a computing task or share in a common computing experience.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A host wireless interface device, comprising:
   one or more processors; and
   one or more wireless transceivers coupled to the one or more processors;
   memory that includes a plurality of computer-executable components, the plurality of computer-executable components comprising:
      a detection component configured to detect that the host wireless interface device is within a device proximity range of a dependent wireless interface device that is configured to wirelessly communicate with the host wireless interface device and to be incapable of establishing direct communication with a computing device, the dependent wireless interface device configured to communicate with the computing device through an indirect communication connection established through the host wireless interface device;
      a device connection component that is configured to establish a first wireless communication connection via the one or more wireless transceivers between the dependent wireless interface device and the host wireless interface device;
      a host connection component that is configured to:
         establish a second wireless communication connection between the host wireless interface device and the computing device via the one or more wireless transceivers when the host wireless interface device is within a host connection distance of the computing device,
         negotiate a communication relationship with the dependent wireless interface device when the dependent wireless interface device is another host wireless interface device by causing the host wireless interface device to act as another dependent wireless interface device configured to communicate with the other host wireless interface device when the other host wireless interface device is higher on a device hierarchy list than the host wireless interface device, and
         establish a third wireless communication connection with the other host wireless interface device based on the negotiated communication relationship when the dependent wireless interface device is the other host wireless interface device; and
      a user interface component that enables a user to exchange data with the computing device via the second wireless communication connection established between the host wireless interface device and the computing device.

2. The host wireless interface device of claim 1, further comprising a user interface, wherein the host connection component is further configured to:
   detect that a new computing device is closer in proximity to the host wireless interface device than the computing device;
   provide, via the user interface, a prompt to establish a fourth wireless communication connection via the one or more wireless transceivers with the new computing device;
   receive a user input directing establishment of the fourth wireless communication connection; and
   establish, in response to the received user input, the fourth wireless communication connection.

3. The host wireless interface device of claim 1, wherein the device connection component is further configured to terminate the first wireless communication connection with the dependent wireless interface device when:
   the dependent wireless interface device is no longer within a device operation range of the host wireless interface device, the device operation range being less than or equal to the device proximity range; or
   a user request to disconnect the dependent wireless device from the host wireless device is received at the host wireless interface device or the dependent wireless interface device.

4. The host wireless interface device of claim 1, further comprising an authentication component that is configured to authenticate the dependent wireless interface device to the host device during establishment of the first wireless communication connection.

5. A host wireless interface device comprising:
one or more processors;
one or more wireless transceivers coupled to the one or more processors and configured to selectively communicate with a first computing device or a second computing device;
a user interface configured to receive user input(s) regarding connection(s) to computing device(s);
a computer readable memory storing computer-executable instructions that, when executed, cause one or more processors to perform acts comprising:
detecting a wireless device within a device proximity range;
establishing a first wireless communication connection with the wireless device when the wireless device is a dependent wireless interface device that is configured to wirelessly communicate with the host wireless interface device while being incapable of establishing direct communication with the first computing device or the second computing device;
establishing, when the wireless device is the dependent wireless interface device, a second wireless communication connection with a selected one of the first computing device and the second computing device based at least in part on at least some of the user input(s) from the user interface, wherein the second wireless communication connection enables the dependent wireless interface device to exchange data with the selected computing device via the first wireless communication connection and the second wireless communication connection;
negotiating a communication relationship with the wireless device when the wireless device is another host wireless interface device by causing the host wireless interface device to act as another dependent wireless interface device configured to communicate with the other host wireless interface device when the other host wireless interface device is higher on a device hierarchy list than the host wireless interface device; and
establishing a third wireless communication connection with the other host wireless interface device based on the negotiated communication relationship when the wireless device is the other host wireless interface device.

6. The host wireless interface device of claim 5, the computer readable memory further comprising computer-executable instructions that, when executed, cause the one or more processors to perform an act of terminating the second wireless communication connection when the host wireless interface device moves beyond a host operation range of the selected computing device.

7. The host wireless interface device of claim 5, the computer readable memory further comprising computer-executable instructions that, when executed, cause the one or more processors to perform a further act of terminating the second wireless communication connection and establishing a fourth wireless communication connection to the non-selected one of the first computing device and the second computing device in response to at least some of the user input(s) from the user interface.

8. The host wireless interface device of claim 7, the computer readable memory further comprising computer-executable instructions that, when executed, cause the one or more processors to perform acts that further comprise:
detecting that the second computing device is closer in proximity to the host wireless interface device than the first computing device; and
outputting a prompt via the user interface to establish the fourth wireless communication connection with the second computing device.

9. The host wireless interface device of claim 5, wherein the host wireless device was previously dependent on the other host wireless interface device for exchanging data with the selected computing device.

10. The host wireless interface device of claim 5, wherein the negotiating the communication relationship includes causing the host wireless interface device to act as another dependent wireless interface device configured to communicate with the other host wireless interface device when the host wireless interface device completes a user interface set that includes the other host wireless interface device.

11. The host wireless interface device of claim 5, wherein the other host wireless interface device has at least one of more advanced software or more advanced hardware components than the host wireless interface device.

12. The host wireless interface device of claim 5, wherein the negotiating the communication relationship includes causing the host wireless interface device to act as another dependent wireless interface device configured to communicate with the other host wireless interface device in response to a user input via the user interface.

13. The host wireless interface device of claim 5, wherein both the host wireless interface device and the other host wireless interface device randomly designate the host wireless interface device as a dependent wireless interface device.

14. The host wireless interface device of claim 5, wherein the other host wireless interface device has established a wireless communication connection with the selected computing device prior to the host wireless interface establishing a different wireless communication connection with the selected computing device.

15. A computer implemented method, comprising:
forming, by a host wireless interface device, a wireless device group by establishing a wireless communication connection between the host wireless interface device and each of one or more dependent wireless interface devices, the dependent wireless interface devices being configured to not directly communicate with a computing device;
determining whether the wireless device group that includes the host wireless device and the one or more dependent wireless interface devices was previously communicatively connected with the computing device;
establishing a first wireless communication connection between the host wireless interface device and the computing device in response to determining that the host wireless interface device is within a host connection distance of the computing device and the wireless device group was previously communicatively connected with the computing device;
negotiating a communication relationship between the host wireless interface device and a selected dependent wireless interface device of the one or more dependent wireless interface devices when the selected dependent wireless interface device is another host wireless interface device by causing the host wireless interface device to act as another dependent wireless interface device configured to communicate with the other host wireless interface device when the other host wireless interface device is higher on a device hierarchy list than the host wireless interface device; and establishing a second wireless communication connection with the other host wireless interface device based on the negotiated communication relationship when the selected dependent wireless device is the other host wireless interface device.

16. The method of claim 15, further comprising associating the wireless device group with an active desktop session implemented on the computing device to enable interaction with the active desktop session.

17. The method of claim 15, further comprising authenticating each dependent wireless interface device to the host wireless interface device during establishment of a corresponding wireless communication connection.

18. The method of claim 15, further comprising:
terminating the wireless communication connection between the host wireless interface device and the computing device; and
establishing a second wireless communication connection with a second, different computing device.

* * * * *